United States Patent
Rehof et al.

(10) Patent No.: US 7,797,669 B1
(45) Date of Patent: Sep. 14, 2010

(54) ANALYSIS OF DISTRIBUTED SOFTWARE SYSTEMS VIA SPECIFICATION SUBSTITUTION

(75) Inventors: Niels Jakob Rehof, Redmond, WA (US); Anthony D. Andrews, Sammamish, WA (US); Sriram K. Rajamani, Bellevue, WA (US); Charles Antony Richard Hoare, Cambridge (GB); Cédric Fournet, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1090 days.

(21) Appl. No.: 10/779,002

(22) Filed: Feb. 13, 2004

(51) Int. Cl.
G06F 9/44 (2006.01)
(52) U.S. Cl. ...................... 717/100; 717/124
(58) Field of Classification Search ......... 717/123–129, 717/100; 719/315
See application file for complete search history.

(56) References Cited

U.S. PATENT DOCUMENTS

| | | | |
|---|---|---|---|
| 4,318,182 A | 3/1982 | Bachman et al. | |
| 5,388,189 A | 2/1995 | Kung | |
| 5,434,975 A | 7/1995 | Allen | |
| 5,548,756 A | 8/1996 | Tantry et al. | |
| 5,572,733 A | 11/1996 | Ryu et al. | |
| 5,586,323 A * | 12/1996 | Koizumi et al. | 717/174 |
| 5,590,276 A | 12/1996 | Andrews | |
| 5,590,334 A | 12/1996 | Saulpaugh et al. | |
| 5,682,537 A | 10/1997 | Davies et al. | |
| 5,729,738 A | 3/1998 | Watanabe et al. | |
| 5,734,903 A | 3/1998 | Saulpaugh et al. | |
| 5,748,959 A | 5/1998 | Reynolds | |
| 5,754,860 A * | 5/1998 | McKeeman et al. | 717/124 |
| 5,758,160 A | 5/1998 | McInerney et al. | |
| 5,758,161 A | 5/1998 | Reynolds | |
| 5,812,824 A * | 9/1998 | Dearth et al. | 703/14 |
| 5,960,200 A | 9/1999 | Eager et al. | |
| 5,991,538 A | 11/1999 | Becker | |
| 6,012,081 A | 1/2000 | Dorn et al. | |
| 6,118,448 A | 9/2000 | McMillan et al. | |
| 6,158,045 A * | 12/2000 | You | 717/124 |
| 6,226,666 B1 | 5/2001 | Chang et al. | |
| 6,233,620 B1 | 5/2001 | Gish | |
| 6,253,252 B1 | 6/2001 | Schofield | |
| 6,266,805 B1 | 7/2001 | Nwana et al. | |

(Continued)

OTHER PUBLICATIONS

U.S. Appl. No. 60/450,982, filed Feb. 28, 2003, Rehof et al.
U.S. Appl. No. 10/659,221, filed Dec. 10, 2003, Rehof et al.
"Failures-Divergence Refinement," *FDR2 User Manual—Fifth Edition*, FDR Version 2.69, Formal Systems (Europe) Ltd, http://www.fsel.com/, 84 pages, May 3, 2000.

(Continued)

*Primary Examiner*—Wei Y Zhen
*Assistant Examiner*—Junchun Wu
(74) *Attorney, Agent, or Firm*—Klarquist Sparkman, LLP

(57) ABSTRACT

A distributed software system of communicating software components can be tested for undesirable behavior. A specification of a component can be substituted in place of the component when testing a model of the distributed software system. Thus, the system can be checked to see if it exhibits undesirable behavior without having code for all components of the system. Also, a component can be checked to see if it is in conformance with its specification. If models built with respective components and substituted specifications indicate that the system does not exhibit undesirable behavior, and the components conform to their specifications, then a system assembled from the components will not exhibit the undesirable behavior. Thus, collaborative testing can be achieved, even if no one entity has access to code for the entire distributed system.

22 Claims, 11 Drawing Sheets

U.S. PATENT DOCUMENTS

| | | | |
|---|---|---|---|
| 6,275,871 | B1 | 8/2001 | Reinfelder et al. |
| 6,275,980 | B1* | 8/2001 | Uchihira et al. ............. 717/124 |
| 6,295,515 | B1 | 9/2001 | Kurshan et al. |
| 6,314,555 | B1* | 11/2001 | Ndumu et al. .............. 717/101 |
| 6,385,659 | B1 | 5/2002 | Tuel |
| 6,385,724 | B1 | 5/2002 | Beckman et al. |
| 6,385,765 | B1* | 5/2002 | Cleaveland et al. ......... 717/100 |
| 6,405,363 | B1 | 6/2002 | Carlson et al. |
| 6,412,018 | B1 | 6/2002 | Tuel |
| 6,415,332 | B1 | 7/2002 | Tuel |
| 6,421,681 | B1 | 7/2002 | Gartner et al. |
| 6,434,598 | B1 | 8/2002 | Gish |
| 6,438,745 | B1* | 8/2002 | Kanamaru et al. .......... 717/137 |
| 6,487,665 | B1 | 11/2002 | Andrews et al. |
| 6,529,932 | B1 | 3/2003 | Dadiomov et al. |
| 6,535,864 | B1 | 3/2003 | Zahn |
| 6,546,443 | B1 | 4/2003 | Kakivaya et al. |
| 6,553,438 | B1 | 4/2003 | Coffman et al. |
| 6,574,736 | B1 | 6/2003 | Andrews |
| 6,593,940 | B1 | 7/2003 | Petersen et al. |
| 6,631,362 | B1 | 10/2003 | Ullman et al. |
| 6,698,012 | B1* | 2/2004 | Kossatchev et al. ......... 717/126 |
| 6,742,006 | B2* | 5/2004 | Raduchel et al. ............ 707/200 |
| 6,813,761 | B1 | 11/2004 | Das et al. |
| 6,826,579 | B1 | 11/2004 | Leymann et al. |
| 6,842,894 | B1 | 1/2005 | Havemose |
| 6,850,979 | B1* | 2/2005 | Saulpaugh et al. .......... 709/225 |
| 6,889,379 | B1 | 5/2005 | Lindhorst et al. |
| 6,904,588 | B2 | 6/2005 | Reddy et al. |
| 6,904,590 | B2 | 6/2005 | Ball et al. |
| 6,907,395 | B1 | 6/2005 | Hunt et al. |
| 6,925,466 | B2 | 8/2005 | Jensen et al. |
| 6,944,848 | B2* | 9/2005 | Hartman et al. ............. 717/124 |
| 6,961,925 | B2* | 11/2005 | Callahan et al. ............. 717/128 |
| 6,968,535 | B2 | 11/2005 | Stelting et al. |
| 6,981,249 | B1 | 12/2005 | Knoblock et al. |
| 6,986,117 | B1 | 1/2006 | Teig et al. |
| 7,013,465 | B1 | 3/2006 | Taylor et al. |
| 7,016,966 | B1 | 3/2006 | Saulpaugh et al. |
| 7,055,065 | B2 | 5/2006 | Farchi et al. |
| 7,058,955 | B2 | 6/2006 | Porkka |
| 7,089,317 | B2 | 8/2006 | Jeyaraman et al. |
| 7,203,924 | B2 | 4/2007 | Rehof |
| 2002/0004848 | A1 | 1/2002 | Sudarshan et al. |
| 2002/0004850 | A1 | 1/2002 | Sudarshan et al. |
| 2002/0010781 | A1* | 1/2002 | Tuatini ....................... 709/227 |
| 2002/0144233 | A1 | 10/2002 | Chong et al. |
| 2002/0178401 | A1 | 11/2002 | Ball et al. |
| 2003/0005181 | A1 | 1/2003 | Bau et al. |
| 2003/0167333 | A1 | 9/2003 | Kumar et al. |
| 2003/0204570 | A1 | 10/2003 | Rehof et al. |
| 2003/0204641 | A1 | 10/2003 | Rehof et al. |
| 2003/0204834 | A1 | 10/2003 | Ball et al. |
| 2006/0031750 | A1* | 2/2006 | Waldorf et al. ........... 715/501.1 |

OTHER PUBLICATIONS

"Failures-Divergence Refinement," *FDR2 User Manual—Sixth Edition*, FDR Version 2.80, Formal Systems (Europe) Ltd, http://www.fsel.com/, 84 pages, May 2, 2003.

"Security Protocols," Oxford University Computing Laboratory, http://web.comlab.ox.ac.uk/oucl/work/philippa.broadfoot/securityProtocols.html, 3 pages, website visited on Nov. 18, 2003.

"VeriSoft Home-Page" ©1996-2004 Bell Laboratories, Lucent Technologies, http://cm.bell-labs.com/who/god/verisoft/, 2 pages, website visited on Jan. 12, 2004.

Alur, et al., "MOCHA: Modularity in Model Checking," Proceedings of the Tenth International Conference on Computer Aided Verification (CAV 98), Lecture Notes in Computer Science 1427, pp. 521-525, Springer-Verlag, 1998.

Andrews, et al., "Business Process Execution Language for Web Services, Version 1.1," IBM Corporation and Microsoft Corporation, 136 pages, http://www-106.ibm.com/developerworks/library/ws-bpel/, May 2003.

Baader et al., *Term Rewriting and All That*, Cambridge University Press, pp. i-301, Aug. 1999.

Bultan et al., "Model-Checking Concurrent Systems with Unbounded Integer Variables: Symbolic Representations, Approximations, and Experimental Results," ACM Transactions on Programming Languages and Systems, vol. 21, No. 4, pp. 747-789, Jul. 1999.

Chaki, et al., "Types as Models: Model Checking Message-Passing Programs," In Proceedings, 29th ACM Symposium on Principles of Programming Languages, pp. 45-57, ACM, 2002.

Chinnici, et al., "Web Services Description Language (WSDL) Version 1.2 Part 1: Core Language," W3C Working Draft, http://vvww.w3.org/TR/2003/WD-wsdl12-20030611/, 103 pages, Jun. 2003.

Chinnici, et al., "Web Services Description Language (WSDL) Version 2.0 Part 1: Core Language," W3C Working Draft, 24 pages, http://www.w3.org/TR/wsdl20/, Nov. 2003.

Cleaveland, et al., "The Concurrency Workbench: A Semantics-Based Tool for the Verification of Concurrent Systems," ACM Transactions on Programming Languages and Systems, 15(1):36-72, Jan. 1993.

Condit et al., "Region-Based Model Abstraction," Open Source Quality Meeting at U.C. Berkley, 24 pages, Lecture given on Aug. 8, 2003.

Curbera, et al., "Business Process Execution Language for Web Services, Version 1.0," IBM Corporation and Microsoft Corporation, 84 pages, ftp://www6.software.ibm.com/software/developer/library/ws-bpell.pdf, Jul. 2002.

Flanagan et al., "Atomizer: A Dynamic Atomicity Checker for Multithreaded Programs," *POPL'04*, Venice, Italy, pp. 256-267, Jan. 14-16, 2004.

Godefroid, "Model Checking for Programming Languages using VeriSoft," Proceedings of the $24^{th}$ ACM Symposium on Principles of Programming Languages, pp. 174-186, Paris, Jan. 1997.

Godefroid, "VeriSoft: A Tool for the Automatic Analysis of Concurrent Reactive Software" Proceedings of the $9^{th}$ Conference on Computer Aided Verification, Lecture Notes in Computer Science, vol. 1254, pp. 476-479, Springer-Verlag, Haifa, Jun. 1997.

Godefroid, "Model-Checking' Software with VeriSoft" ©1996-2004 Bell Laboratories, Lucent Technologies, Apr. 2000, http://cm.bell-labs.com/who/god/verisoft/papers.html, 22 pages, website visited Jan. 12, 2004.

Hoare, *Communicating Sequential Processes*, Prentice-Hall International Series in Computer Science, Prentice Hall, pp. i-256, 1985.

Holzmann, "The Model Checker SPIN," IEEE Transactions on Software Engineering, vol. 23, No. 5, 17 pages, May 1997.

Hull, et al., "E-Services: A Look Behind the Curtain," International Conference on Management of Data and Symposium on Principles of Database Systems, Proceedings of the $22^{nd}$ ACM SIGMOD-SIGACT-SIGART Symposium on Principles of Database Systems, pp. 1-14, Jun. 2003.

Igarashi, et al., "A Generic Type System for the Pi-Calculus," http://www.sato.kuis.kyoto-u.ac.jp/~igarashi/papers/pdf/genericpi-tcs.pdf, 39 pages, Jun. 10, 2003.

Lamport, "A New Approach to Proving the Correctness of Multiprocess Programs," ACM Transactions on Programming Languages and System, vol. 1, No. 1, pp. 84-97, Jul. 1979.

Larsen, et al., "Bisimulation Through Probabilistic Testing (Preliminary Report)," Proceedings of the 16th ACM SIGPLAN-AIGACT Symposium on Principles of Programming Languages, pp. 344-352, 1989.

Larsen et al., "UPPAAL in a Nutshell," International Journal on Software Tools for Technology Transfer, 1(1-2), pp. 134-152. Springer-Verlag. 1998.

Lipton, "Reduction: A Method of Proving Properties of Parallel Programs," Communications of the ACM, vol. 18, No. 12, pp. 717-721, Dec. 1975.

McMillan, "A Compositional Rule for Hardware Design Refinement," In O. Grumberg, editor, CAV 97: Computer Aided Verification, Lecture Notes in Computer Science 1254, 42 pages, Springer-Verlag, 1997.

Milner, *Communication and Concurrency*, Prentice-Hall International Series in Computer Science, Prentice Hall, pp. i-260, 1989.
Milner, *Communicating and Mobile Systems: the π-Calculus*, Cambridge University Press, pp. i-161, 1999.
Rajamani, et al., "Conformance Checking for Models of Asynchronous Message Passing Software," Computer Aided Verification: 14th International Conference, CAV 2002, Springer-Verlag, 13 pages, Jul. 2002.
Rajamani, et al., "Abstracts of the Software Model Checking Workshop Talks," http://www.sei.cmu.edu/pacc/smcw/abstracts.html, 3 pages, website visited on Feb. 5, 2004.
Reps et al., "Precise Interprocedural Dataflow Analysis via Graph Reachability," Proceedings of the 22$^{nd}$ ACM SIGPLAN-SIGACT Symposium on Principles of Programming Languages, pp. 49-61, Jan. 1995.
Roscoe, *The Theory and Practice of Concurrency*, Prentice Hall Series in Computer Science, Prentice Hall, pp. i-566, 1998.
Rus et al., "Algebraic Implementation of Model Checking," Proceedings of the 3$^{rd}$ AMAST Workshop on Real-Time Systems held in Salt Lake City, Utah, 20 pages, 1996.
Schneider, "Enforceable Security Policies," ACM Transactions on Information and System Security, vol. 3, No. 1, 18 pages, Feb. 2000.
Sharir et al., "Two Approaches to Interprocedural Data Flow Analysis," *Program Flow Analysis: Theory and Applications*, Prentice-Hall, Inc., pp. 189-233, 1981.
Steffen and Burkart, "Composition, Decomposition and Model Checking of Pushdown Processes," Nordic Journal of Computing, vol. 2, pp. 89-125, 1995.
Vardi et al., "An Automata-Theoretic Approach to Automatic Program Verification," in Proc. 1$^{st}$ Symp. on Logic in Computer Science, Cambridge, 18 pages, Jun. 1986.
Visser et al., "Model Checking Programs," Proceedings of the 15$^{th}$ International Conference on Automated Software Engineering (ASE), Grenoble, France, 9 pages, Sep. 2000.
U.S. Appl. No. 60/534,884, filed Jan. 5 ,2004, Andrews.
Andrews et al., "Zing: Exploiting Program Structure for Model Checking Concurrent Software," in CONCUR 2004, http://www.research.microsoft.com/zing/, 15 pages, 2004.
Andrews et al., "Zing: A Model Checker for Concurrent Software," MSR-TR-2004-10, http://www.research.microsoft.com, 7 pages, 2004.
Ball et al., "The SLAM Project: Debugging System Software via Static Analysis," *POPL '02*, Portland, Oregon, USA, pp. 1-3, Jan. 2002.
Ball, T. et al., "Bebop: A Symbolic Model Checker for Boolean Programs," *SPIN 00: SPIN Workshop*, LNCS 1885, 20 pages, 2000.
Bharadwaj et al., "Verifying SCR Requirements Specifications Using State Exploration," *Proc. First ACM SIGPLAN Workshop on Automatic Analysis of Software*, 14 pages, Jan. 1997.
Broder A., "Some Applications of Rabin's Fingerprinting Method," *Sequences II: Methods in Communications, Security and Computer Science*, pp. 1-10, 1993.
Brookes, S.D. et al., "A Theory of Communicating Sequential Processes," *Journal of the ACM*,31(3):560-599, 1984.
Bush et al., "A Static Analyzer for Finding Dynamic Programming Errors," *Software—Practice and Experience*, vol. 30, pp. 775-802, 2000.
Corbett et al., "Bandera: Extracting Finite-State Models from Java Source Code," In Proceedings of the 22nd International Conference on Software Engineering, Ireland, ACM Press, pp. 439-448, 2000.
Das et al., "ESP: Path-Sensitive Program Verification in Polynomial Time," *PLDI'02*, Berlin, Germany, pp. 57-68, Jun. 2002.
Dwyer, Matthew et al., "Tool-Supported Program Abstraction for Finite-state Verification," *ICSE 01: International Conference on Software Engineering*, pp. 1-10, 2001.
Flanagan et al., "Thread-Modular Verification for Shared-Memory Programs," HP Labs Technical Reports, SRC Technical Note 2001-003, Compaq Computer Corporation, 20 pages, Nov. 19, 2001.
Flanagan et al., "Thread-Modular Verification for Shared-Memory Programs," Lecture Notes in Computer Science, Proceedings of the 11$^{th}$ European Symposium on Programming Languages and Systems, Springer-Verlag, London, UK, 15 pages, 2002.

Flanagan et al., "Transactions for Software Model Checking," Electronic Notes in *Theoretical Computer Science*, 89(3)1-22, 2003.
Fournet, C. et al., "Stuck-Free Conformance Theory for CCS," *MSR Technical Report-2004-69*, 20 pages, Feb. 2004, revised Jul. 2004.
Freund et al., "Checking Concise Specifications for Multithreaded Software," FTfJP'2003, Proceedings of the Fifth ECOOP Workshop on Formal Techniques for Java-like Programs, Darmstadt, Germany, 10 pages, Jul. 21, 2003.
Freund et al., "Checking Concise Specifications for Multithreaded Software," Williams College Technical Note Jan. 2002 (revised Dec. 2003), 10 pages, Dec. 2003.
Henzinger et al., "Decomposing refinement proofs using assume-guarantee reasoning," Proceedings of 2000 IEEE/ACM International Conference on Computer-aided Design, pp. 245-252, Nov. 2000.
Holzmann, Gerard J., "Logic Verification of ANSI-C code with SPIN," *SPIN 00: SPIN Workshop*, LNCS 1885, 15 pages, 2000.
Hunt, James, "Delta Algorithms: An Empirical Analysis," *ACM Transactions on Software Engineering and Methodology*, 7(2):192-214, Apr. 1998.
Iosif, R. et al., "dSPIN: A Dynamic Extension of SPIN," *SPIN 99: Spin Workshop*, LNCS 1680, 16 pages, 1999.
Per Cederqvist et al., "Version Management with CVS (for CVS 1.11.10)," 184 pages, visited http://www.cvshome.org on Feb. 5, 2004.
Qadeer, Shaz et al., "Summarizing Procedures in Concurrent Programs," *POPL '04*, Jan. 14-16, 11 pages, 2004, Venice, Italy.
Rajamani, et al., "Conformance Checking for Models of Asynchronous Message Passing Software," *CAV 2002*, LNCS 2404, pp. 166-170, 2002.
Rajamani et al., "Contracts and Futures for Asynchronous Programming (Abstract)," *Abstracts of the Software Model Checking Workshop Talks*, www.cs.cmu.edu/~svc/talks/SEI-Workshop/abstracts.html, 1 page, available as early as Mar. 19, 2003.
Ramalingam, G., "Context-Sensitive Synchronization Sensitive Analysis is Undecidable," *ACM Trans. On Programming Languages and Systems*, 22(2)416-430, Mar. 2000.
Robby et al., "Bogor: An Extensible and Highly-Modular Software Model Checking Framework," *FSE 03: Foundations of Software Engineering*, 10 pages, 2003.
Stoller, S.D., "Model-Checking Multi-Threaded Distributed Java Programs," pp. 1-25, Sep. 26, 2000.
"Summarizing Procedures in Concurrent Programs," powerpoint presentation presented at Dagstuhl Seminar on Applied Deductive Verification, 37 pages, 2003.
"Summarizing Procedures in Concurrent Programs," powerpoint presentation presented at ACM Symp on Principles of Programming Languages, 24 pages, 2004.
Ugarte et al., "Functional Vector Generation for Assertion-Based Verification at Behavioral Level Using Interval Analysis," *IEEE*, pp. 102-107, 2003.
Whaley et al., "Compositional Pointer and Escape Analysis for Java Programs," Proceedings of the 14$^{th}$ ACM SIGPLAN, Conference on Object-Oriented Programming, Systems, Languages, and Applications, Denver, Colorado, ACM Press, New York, NY, pp. 187-206, 1999.
Yang et al., "Symbolic Model Checking for Event-Driven Real-Time Systems," *ACM Transactions on Programming Languages and Systems*, 19(2):386-412, Mar. 1997.
Zing: "Exploiting Program Structure for Model Checking Concurrent Software," presented at *CONCUR 2004*, 50 pages, 2004.
Zing: "A Systematic State Explorer for Concurrent Software," powerpoint presentation, 35 pages, at least as early as Oct. 30, 2005.
Abadi, M. and Lamport, L., "Composing Specifications," *ACM Transactions on Programming Languages and Systems*, 15(1):73-132, 1993.
Abadi, M. and Lamport, L., "Conjoining Specifications," *ACM Transactions on Programming Languages and Systems*, 17(3):507-534, 1995.
Abadi, M. and Lamport, L., "The Existence of Refinement Mappings," *LICS 88: Logic in Computer Science*, pp. 165-175, 1988.
Agha, Gul A., *Actors: A Model of Concurrent Computation in Distributed Systems*, TOC 4 pp., 1988.

Alur, R. and Henzinger T., "Reactive Modules," *Proceedings of the 11th Annual Symposium on Logic in Computer Science*, pp. 207-218, 1996.

Alur, R., Henzinger, T., Kupferman, O. and Vardi, M., "Alternating Refinement Relations," *CONCUR 98: Concurrency Theory*, LNCS 1466, pp. 163-178, 1998.

Amtoft, Torben, Nielson, Flemming and Nielson, Hanne R., *Type and Effect Systems, Behaviours for Concurrency*, TOC 4 pp., 1999.

Brinksma, E., Jonsson, B. and Orava, F., "Refining Interfaces of Communicating Systems," *TAPSOFT 91: Theory and Practice of Software Development*, LNCS 494, pp. 297-312, 1991.

Christensen, S., Hirshfeld, Y., and Moller, F., "Decidable Subsets of CCS," *The Computer Journal*, 37(4):233-242, 1994.

Clarke, Jr., Edmund M., Grumberg, Oma and Peled, Doron A., *Model Checking*, TOC 4 pp, 1999.

Customer Support Consortium (CSC) and Desktop Management Task Force (DMTF), "Service Incident Exchange Standard (sis) Specification, version 1.1," *Technical Report, DMTF*. 18 pp., Feb. 23, 2000. Available at www.dmtf.org.

de Alfaro, L. and Henzinger, T., "Interface Theories for Component-Based Design," *EMSOFTOJ: Embedded Software*, LNCS, 20 pp., Oct. 8-10, 2001.

Dill, David L., *Trace Theory for Automatic Hierarchical Verification of Speed-Independent Circuits*, TOC 4 pp., 1989.

Eiriksson, A., "The Formal Design of 1M-Gate ASICs," *FMCAD 98: Formal Methods in Computer-Aided Design*, LNCS, 1522, pp. 49-63, 1998.

Ellis et al., "Extending the behavioral capabilities of the object oriented paradigm with an active model of progation," *ACM*, pp. 319-325, 1990.

Feret, J., "Confidentiality Analysis of Mobile Systems," *Proceedings of the International Static Analysis Symposium (SAS'00)*, LNCS 1824, 22 pp., Jun. 29-Jul. 1, 2000.

Flanagan C, and Freund, S.N., "Type-Based Race Detection for Java," *ACM Symposium on Applied Computing*, pp. 219-232, 2000.

Flanagan, C. and Abadi, M., "Types for Safe Locking," *Proceedings of ESOP*, pp. 91-108, LNCS 1576, 1999.

Fournet, C. and Gonthier, G., "The Reflexive CHAM and the Join-Calculus," *POPL 96: Principles of Programming Languages*, pp. 372-385, 1996.

Fournet, C., and Gonthier, G., "The Join calculus: a language for distributed mobile programming," *Applied Semantics Summer School*, 84 pp., Sep. 2000.

Fournet, C., Le Fessant, F., Maranget, L. And Schmitt, A, "The JoCaml language beta release, documentation and user's manual," *Technical Report, INRIA*, 62 pp., Jan. 2001. Available at pauillac.inria.fr/jocaml/htmlman.

Ghelli, "A static type system for message passing," ACM OOPSLA, pp. 129-145, 1991.

Grieskamp et al., "A schema language for coordinating construction and composition of paitial behavior descriptions," *ACM SCESM*, pp. 59-65, 2006.

Gordon, A. and Jeffrey, A., "Typing Correspondence Assertions for Communication Protocols," *MFPS: Mathematical Foundations of Programming Semantics*, pp. 99-120, 2001.

Gosling, James, Joy, Bill, Steele, Guy and Bracha, Gilad, *The Java Language Specification*, TOC 13 pp., 1996.

Hardin, R., Har'El, Z. and Kurshan, R., "COSPAN," *Computer Aided Verification, 8th International Conference, CAV '96*, pp. 423-427, Jul. 31-Aug. 3, 1996.

Henzinger, T., Liu, X., Qadeer, S. And Rajamani, S., "Formal Specification and Verification of a Dataflow Processor Array," *Proceedings of the International Conference on Computer-Aided Design*, pp. 494-499, 1999.

Henzinger, T., Qadeer, S. and Rajamani, S., "You Assume, We Guarantee: Methodology and Case Studies," *10th International Conference, CAV '98: Computer Aided Verification*, pp. 440-451, Jun. 28-Jul. 2, 1998.

Henzinger, T.A., Qadeer, S., Rajamani, S.K. and Tasiran, S., "An Assume-Guarantee Rule for Checking Simulation," *FMCAD 98: Formal Methods in Computer-Aided Design*, LNCS 1522, pp. 421-432, 1998.

Holzmann, Gerard J., *Design and Validation of Computer Protocols*, TOC 6 pp., 1991.

Honda, K., Vasconcelos, V.T. and Kubo, M., "Language Primitives and Type Discipline for Structured Communication-Based Programming," *7th European Symposium on Programming, ESOP98*), 19 pp., Mar. 28-Apr. 4, 1998.

Jarodi et al, "An object passing model for parallel programming," *IEEE COMPSAC*, pp. 138-143, 2003.

Jurjens, "A UML statecharts semantics with message passing," ACM SAC, pp. 1009-1013, 2002.

Karp, R.M. and Miller, R.E., "Parallel Program Schemata", *Journal of Computer and System Sciences*, 3:147-195, 1969.

Lamport, L., "Proving the Correctness of Multiprocess Programs," *IEEE Transactions on Software Engineering*, SE-3(2):125-143, 1977.

Larsen, K.G. and Milner, R., "A Compositional Protocol Verification Using Relativized Bisimulation," *Information and Computation*, 99:80-108, 1992.

Mehra et al., "A comparison of two model based performance prediction techniques for message passing parallel programs," *ACM Sigmetrics*, pp. 181-190, 1994.

Milner, Robin, "A Theory of Type Polymorphism in Programming," *Journal of Computer and System Sciences*, vol. 17, pp. 348-375, 1978.

Minoura, Toshimi, "Deadlock Avoidance Revisited," *ACM*, pp. 1023-1048, 1982.

Misra, J. and Chandy, K., "Proofs of Networks of Processes," *IEEE Transactions on Software Engineering*, SE-7(4):417-426, 1981.

Najjar, W.A., Lee, E.A. and Gao, G.R., "Advances in the Dataflow Computational Model," *Parallel Computing*, 25:1907-1929, 1999.

Nielson, H.R. and Nielson, F., "Higher-Order Concurrent Programs with Finite Communication Topology," *POPL, ACM Symposium on Principles of Programming Languages*, pp. 84-97, ACM, 1994.

Niu et al., "Composable semantics for model based notations," *ACM SIGNOFT*, pp. 149-158, 2002.

Notice of Allowance—U.S. Appl. No. 10/136,680, mail date: Feb. 9, 2006, 7 pp.

Notice of Allowance—U.S. Appl. No. 10/136,680, mail date: Dec. 22, 2006, 6 pp.

Office Action—Final—U.S. Appl. No. 10/136,680, mail date: Sep. 25, 2006, 6 pp.

Office Action—Non-Final—U.S. Appl. No. 10/136,680, mail date: Sep. 26, 2005, 12 pp.

Office Action—Non-Final—U.S. Appl. No. 10/136,680, mail date: May 22, 2006, 5 pp.

Pierce, Benjamin C. and Turner David N., "Pict: A Programming Language Based on the Pi-Calculus," *Proof Language and Interaction: Essays in Honour of Robin Milner, The MIT Press*, 42 pp., 2000.

Puntigam, F. and Peter, C, "Changeable Interfaces and Promised Messages for Concurrent Components," *ACM Symposium on Applied Computing*, pp. 141-145, 1999.

Ravara, A. and Vasconcelos, V., "Typing Non-Uniform Concurrent Objects," *Proceedings of CONCUR 2000*, LNCS 1877, pp. 474-488, 2000.

Sangiorgi, D., "$\pi$-Calculus, Internal Mobility, and Agent-Passing Calculi", *Theoretical Computer Science*, 167(2), 42 pp., 1996.

Sangiorgi, D., "A Theory of Bisimulation for the $\pi$-Calculus," *Acta Informatica*, pp. 69-97, vol. 33, 31 pp., 1996.

Scaife, N. R., "A Survey of Concurrent Object-Oriented Programming Languages," *Technical Report RM/96/4*, Heriot-Watt University, 24 pp., 1996.

Serbedzija, Nikola B., "Asynchronous Communication on Occam," *ACM*, pp. 51-62, 1988.

Stallings, William Ph.D., *Handbook of Computer-Communications Standards*, vol. 2, $2^{nd}$, TOC 4pp, 1990.

Steele Jr., Guy L, "Making Asynchronous Parallelism Safe for the World," *ACM*, p. 218-231, 1990.

Yoshida, N., "Graph Types for Monadic Mobile Processes," *FST-TCS: Software Technology and Theoretical Computer Science*, LNCS 1180, pp. 371-387, 1996.

\* cited by examiner

ANALYSIS OF DISTRIBUTED SOFTWARE SYSTEMS VIA SPECIFICATION SUBSTITUTION

TECHNICAL FIELD

The technical field relates generally to modeling and testing of distributed software.

BACKGROUND

With the widespread popularity of the Internet, distributed applications are becoming more important in the field of computing. Distributed applications include components running in separate runtime environments, such as on separate machines connected by a network. For example, in an order processing application, components of the system may run at different geographical locations and be controlled by different companies. One component may track what the customer has ordered, another component may track remaining inventory, and still another component may track account information. The components may be connected via a network and work together by communicating over the network whenever a customer places an order.

Unfortunately, distributed applications are difficult to design and test. First, there are physical limitations. For example, it may be difficult to assemble all of the software related to a distributed application in one location for review by a programmer. In many cases, the software is operated by different companies, who may be separated by great distance and use entirely different programming environments.

Second, even if it were possible to assemble the code into one location, companies may be reluctant to share their programming code with others. Such programming represents significant work on the part of a team of highly skilled programmers, so it is often simply not open for inspection by outsiders.

Third, many distributed applications are inherently concurrent. Due to the complexities of concurrent programs, errors are easily introduced but difficult to pinpoint. Programmers are quite familiar with and have even developed tools to help analyze sequential programs. However, concurrent programs pose a difficult challenge that is not easily grasped by most programmers, and tools written for sequential scenarios do not work well for concurrent systems. For example, even a simple distributed application involving three concurrently running components may have a dizzying array of possible sequences of events. If a programmer fails to anticipate a particular rare sequence of events, the program may become deadlocked (e.g., at least one component is blocked waiting for messages that are never sent) or otherwise behave unexpectedly. Error and timeout conditions are particularly fruitful areas for possible programming flaws.

Unfortunately, the appearance of a rare sequence of events can depend on seemingly random factors, such as machine load, connection speed, and the like. Thus, for purposes of testing, the systems appear to behave in a non-deterministic manner. Therefore, it may be almost impossible to reliably reproduce a particular error. As a result, the error becomes an elusive but persistent problem in the software.

Model checking has been used successfully to check sequential programs. However, typical approaches fail to take into account the possible interleaving that occurs in concurrent applications. In principle, model checking could be performed to analyze distributed applications, but such an approach has two serious disadvantages. First, it quickly leads to state explosion, because the state space of the system grows exponentially with the number of concurrent components. Second, it requires that the entire system be available for analysis, which is especially unrealistic for distributed systems such as web services. Therefore, new technologies in the field of analyzing distributed applications are needed.

SUMMARY

The externally observable message-passing behavior of a component of a distributed software system can be specified via a specification. Such specifications can be used for modeling when checking for undesirable behavior or when checking whether the component complies with its specification.

For example, when testing a distributed software system, a specification of the externally observable message-passing behavior of a component can be substituted in place of the component. In this way, testing can proceed even if logic for the internal workings of one or more of the components is not available to all parties.

Such testing can determine whether the system will exhibit certain undesirable behaviors, such as becoming deadlocked or stuck. Thus, subtle concurrency errors in implementations of distributed applications such as web services can be found.

The foregoing and other features and advantages will become more apparent from the following detailed description of disclosed embodiments, which proceeds with reference to the accompanying drawings.

DETAILED DESCRIPTION

Overview

In the following description of the disclosed technology, reference is made to the accompanying drawings which form a part hereof, and in which is shown by way of illustration specific embodiments in which the invention may be practiced. Other embodiments may be utilized and structural changes may be made without departing from the scope of the disclosed technology.

EXAMPLE 1

Exemplary Distributed Software System

Figure 1:
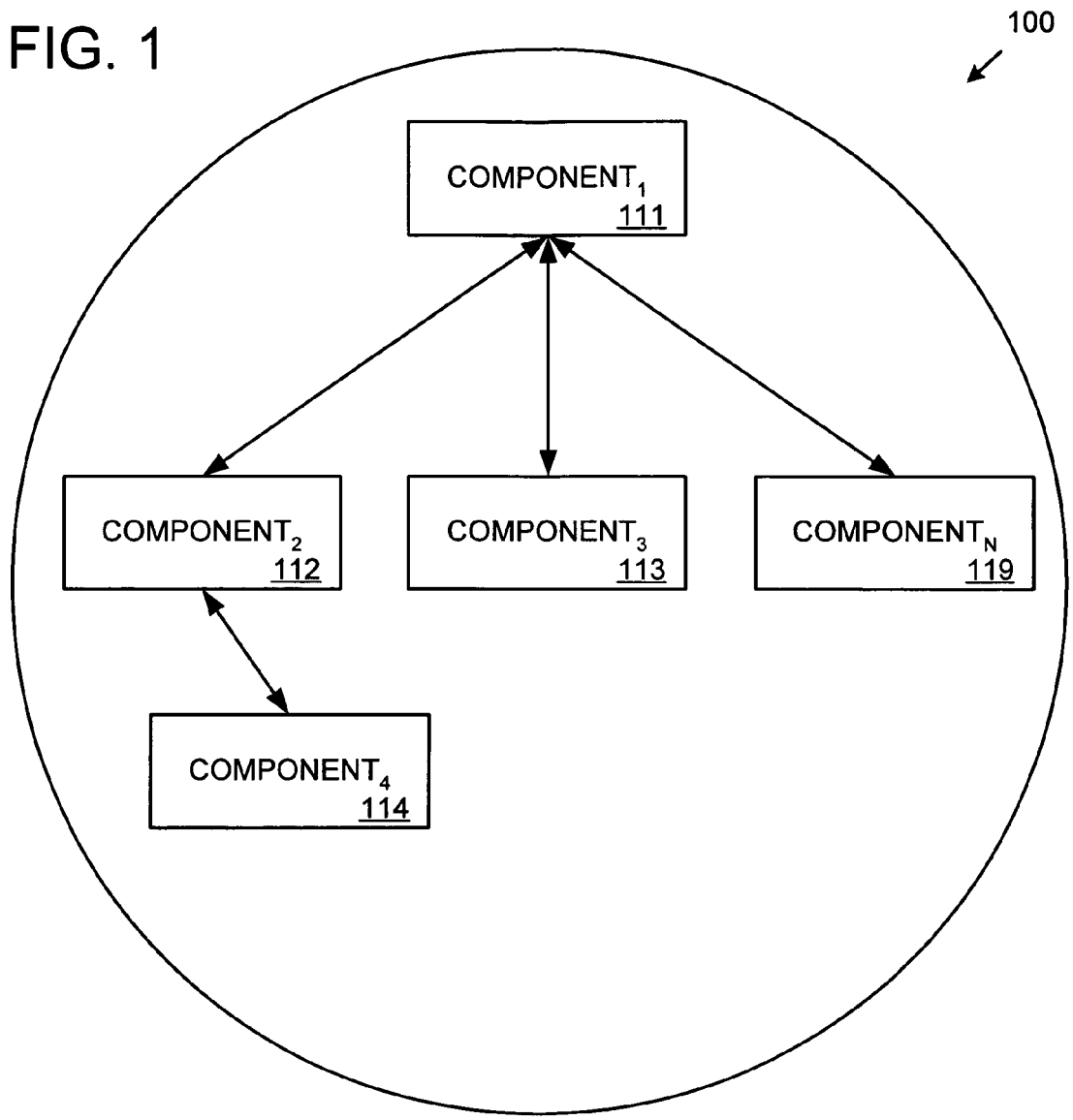
FIG. 1 is a block diagram showing an exemplary distributed software system.

FIG. 1 shows an exemplary distributed software system 100, such as that in the prior art. In the example, the distributed software system 100 includes a set of a plurality of N components 111, 112, 113, 114, and 119. Components that access other components can be described as clients of the other components. For example, component, 111 can be described as a client of $component_2$ 112. Conversely, a component that is accessed by another component can be described as a server of the accessing component. A server component may itself be a client of other components. For example, when component, 111 asks $component_2$ 112 to perform certain processing, $component_2$ 112 may in turn contact $component_4$ 114 as a result. Further, $component_4$ 114 may in turn send a request to another component, and so on.

Requests from the components and responses to the requests can take various forms, such as messages. The messages can be in any of a variety of formats, and components running on completely different platforms and at different geographical locations can support a common message-passing protocol.

In any of the examples herein, the various components can execute concurrently. In other words, processing within the various concurrently executing components can proceed in an asynchronous manner, not stopping to wait for completion of tasks by the other concurrently executing components.

EXAMPLE 2

Exemplary Distributed Software System that Uses Message-Passing

Figure 2:
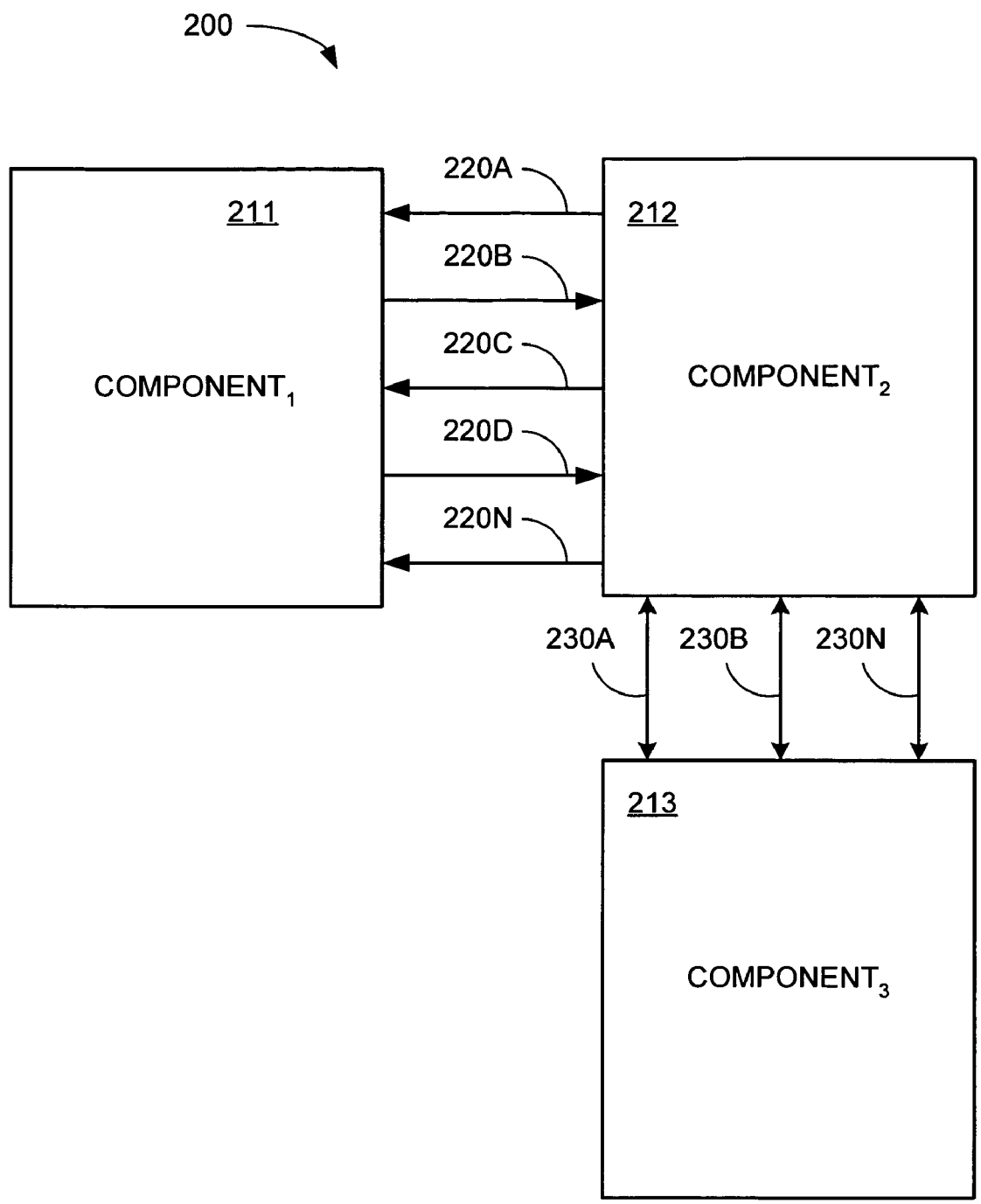
FIG. 2 is a block diagram representing an exemplary system that uses message-passing.

FIG. 2 shows an exemplary distributed software system 200 that uses message-passing. Any of the examples described herein can be used for such a system. Although the example shows three components 211, 212, and 213 in communication over a network, a distributed system can be made up of two or more components in communication over a network. In the example, the network connections can be represented as one or more channels 220A-220N and one or more channels 230A-230N. The system can alternatively be described as a collection of client and server components. Which components are considered clients and which are considered servers can depend on the perspective of the description. Such a system can be used to represent a distributed application.

For example, in a web services application, a message can be passed from one component to another to request inventory information, credit information, account information, order cancellation information, and the like. The component receiving a request (e.g., $component_2$ 212) can, in response to the request, make requests to one or more other components (e.g., $component_3$ 213) and so forth. The messaged components can respond by providing a message in answer to a request. In some cases, a timeout may occur so that if a response is not received within a certain amount of time, the requesting component takes appropriate action (e.g., takes an alternative action or tries again).

EXAMPLE 3

Another Exemplary Distributed Software System that Uses Message-Passing

Figure 3:
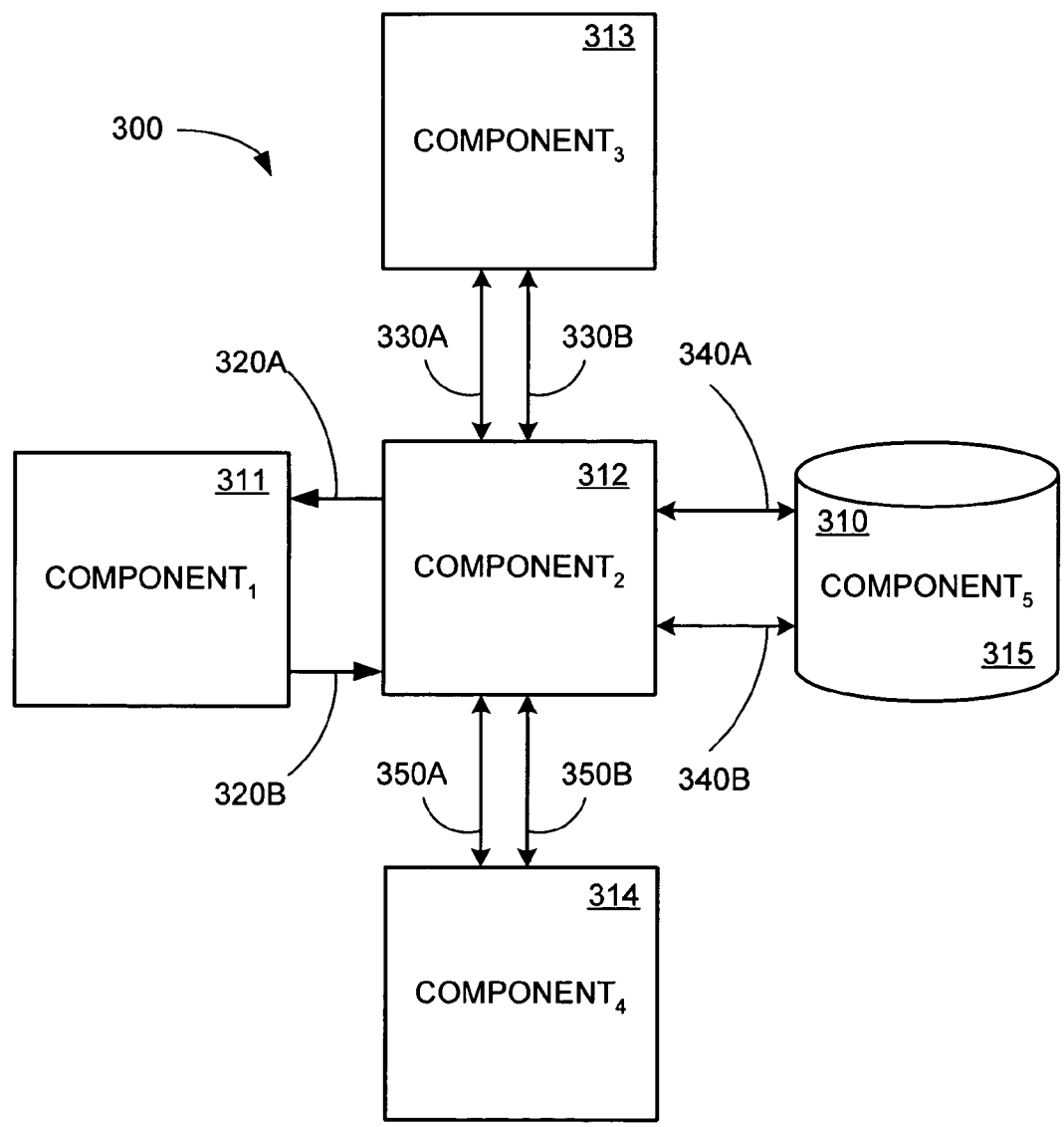
FIG. 3 is a block diagram representing another exemplary system that uses message-passing.

FIG. 3 shows an exemplary distributed software system 300 that uses message-passing. In the example, five components 311-315 are in communication over a network. The network connections can be represented as one or more channels 320A-320B, one or more channels 330A-330B, one or more channels 340A-340B, and one or more channels 350A-350B. For analysis purposes, communications are sometimes described as taking place over multiple channels (e.g., one for each message type). In practice, however, a single connection or channel can be used for more than one message type.

In any of the examples herein, the exemplary systems (e.g., the system 300) can also be used to represent a distributed web services application. For example, the components can represent various web services, including a database 315. The components can be on different platforms and be located in different geographical locations.

EXAMPLE 4

Figure 4:
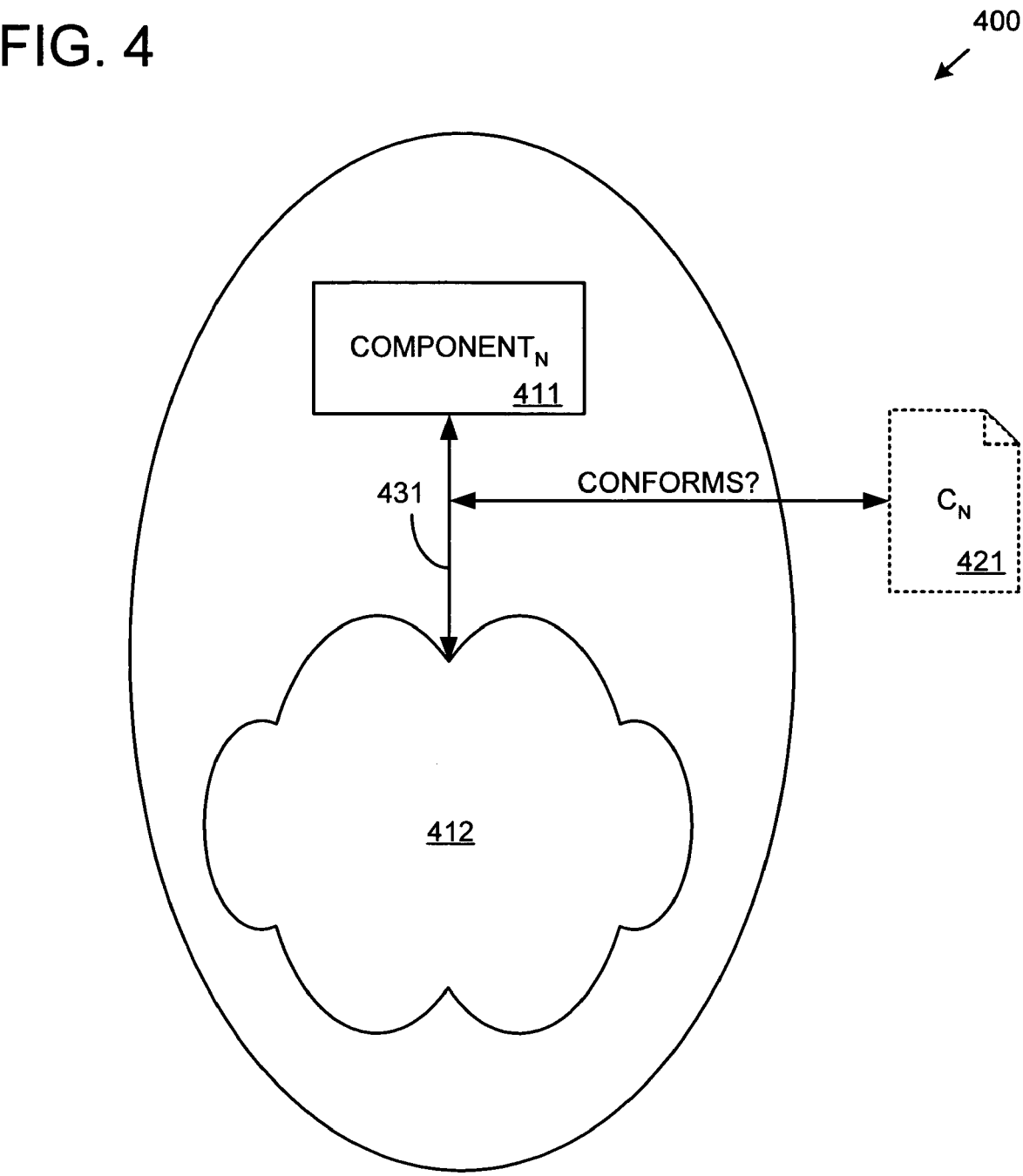
FIG. 4 is a block diagram illustrating an exemplary specification of externally observable message-passing behavior of a component.

Exemplary Specification of Externally Observable Message-Passing Behavior of Component FIG. 4 shows an exemplary distributed software system 400 including an exemplary component 411 that interacts with one or more other components 412 in the system 400. In the example, the one or more other components 412 can be considered the environment 412 with which the component 411 interacts.

An interface specification 421 of the message-passing component 411 can specify the externally observable message-passing behavior of the component 411. For example, the specification can state what response messages are expected in response to request messages, and what response messages will be sent in response to requests received by the component 411. The specification 421 can specify the type and sequence of message types. For example, message-passing rules can be defined that indicate the expectations of the component 411 (e.g., what messages it expects).

The specification 421 need not include the entire logic of the internal workings of the component 411. For example, certain internal processing (sometimes called τ moves) need not be represented because they are not externally observable.

The specification 421 can be stored as one or more data structures in one or more computer-readable media. If desired, a particular language can be used for the specification 421 (e.g., the Business Process Execution Language for Web Services, or "BPEL4WS" or "BPEL"), but other languages can be used with the technologies described herein. Because the specification can be thought of as an agreement between components on acceptable message-passing behavior, the specification is sometimes called a "contract."

The specification 421 can also be represented as a state machine diagram. Or, a state machine diagram can be converted into the specification 421.

The actual message passing behavior 431 of the component 411 can be compared against the specification 421 to determine whether the component 411 conforms to the specification 421. In such a case, the component 411 is sometimes called an "implementation" of the specification 421.

Although the specification 421 is typically written by a programmer or other software professional, conformance checking can be performed by software, resulting in a mechanized process not relying on human evaluation of the specification 421 or the component 411.

For purposes of conformance checking, the component 411 may be converted to a representation of the component 411. During such conversion, various superfluous functionality related to the component 411 may be omitted from its representation.

EXAMPLE 5

Exemplary Substitutability

Figure 5:
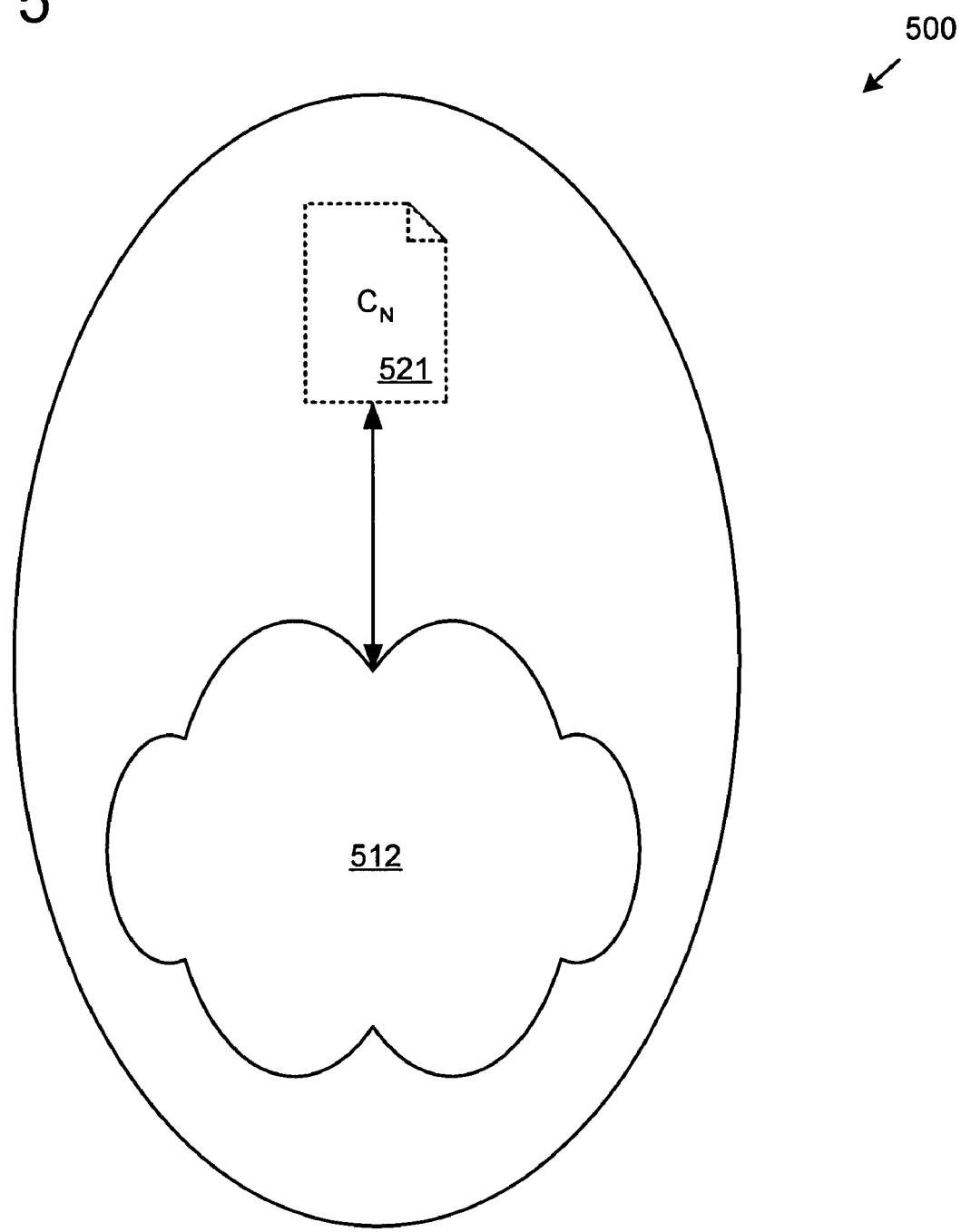
FIG. 5 is a block diagram illustrating substitution of an exemplary specification in place of a component in a model of a distributed software system.

FIG. 5 shows an exemplary model 500 for modeling the software system 400 shown in FIG. 4. The environment 512 can model the environment 412 of FIG. 4. In the example, the specification of the externally observable message-passing behavior of the component 521 has been substituted for the component 411 of FIG. 4. As described below, such substitution can be made in the model while guaranteeing certain conditions.

For example, the model 500 can be tested for certain undesirable behavior (e.g., undesirable message-passing behavior). If the model is determined to not have the undesirable behavior, then a system incorporating a component conforming to the specification 521 (e.g., the component 411 of FIG. 4) will also not have the undesirable behavior.

EXAMPLE 6

Exemplary Use of Substitutability to Test a Distributed Message-Passing System

Figure 6:
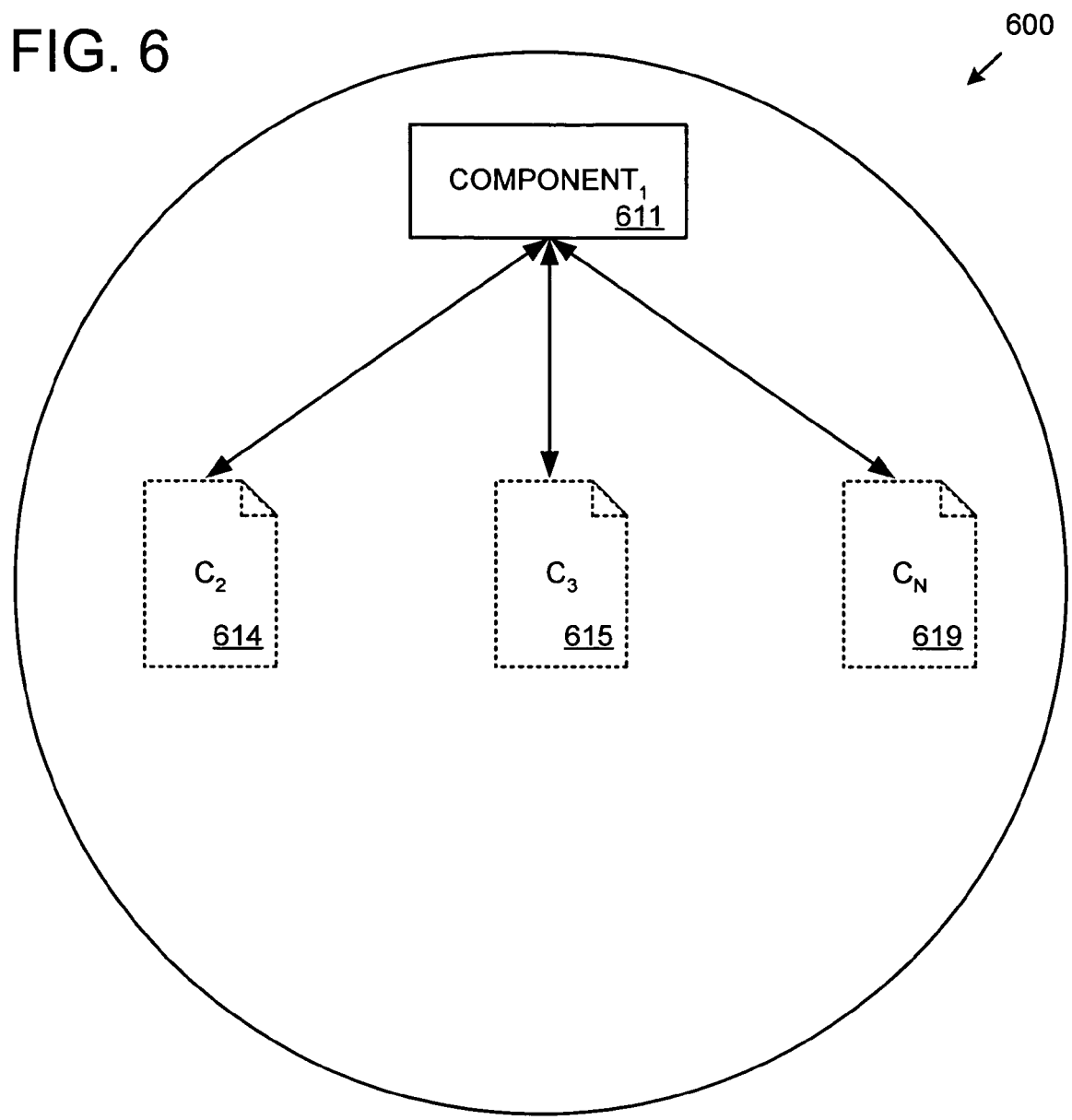
FIG. 6 is a block diagram illustrating an exemplary use of substitutability to test a distributed message-passing system.

FIG. 6 shows an exemplary model 600 of a distributed system (e.g., the distributed system 100 of FIG. 1). Taking advantage of the property of substitutability described earlier, specifications 614, 615, and 619 have been substituted for components 112, 113 and 119, respectively. The model can then be tested for various properties, such as whether the component 611 conforms to its a specification or whether the system 600 will exhibit certain undesirable behavior.

There are various advantages to the arrangement 600. For example, being able to test the model without access to the substituted components can avoid problems with the logistics of obtaining and testing the substituted components or an organization's unwillingness to provide the substituted components. Further, the complexity of the model 600 is reduced because it contains specifications in place of actual implementations. Such specifications can represent the externally observable message-passing behavior only and thus result in less processing than if the entire component were tested.

Accordingly, by applying the substitutability property, an entire system can be tested for undesirable behavior by testing each of the components in turn, substituting specifications for the other components. If the components conform to their respective specifications, and the tests of individual components using substitutions indicate that the system will not exhibit certain undesirable behavior, then the system as a whole will not exhibit the undesirable behavior.

EXAMPLE 7

Exemplary Undesirable Behavior

In any of the examples herein, models can be used to detect whether the modeled software will exhibit undesirable behavior. Exemplary undesirable behavior can take a variety of forms. An example of undesirable behavior includes undesirable message-passing behavior (e.g., message-passing related deadlock). For example, deadlock can include situations in which a component is awaiting a message that will never be sent (e.g., by another component). Another undesirable behavior is sending a message that is not expected (e.g., by another component). Collectively, these conditions can be referred to as being "stuck" or "stuckness." A model can thus be tested to see if it is stuck-free. Stuck-freeness is a safety property; other safety properties can be tested.

Stuckness can result from a variety of conditions. For example, a programmer may have failed to anticipate a particular situation (e.g., sequence of messages), which results in deadlock. Or, a component may interact with another system that itself has become stuck.

EXAMPLE 8

Exemplary System for Analyzing Distributed Software

Figure 7:
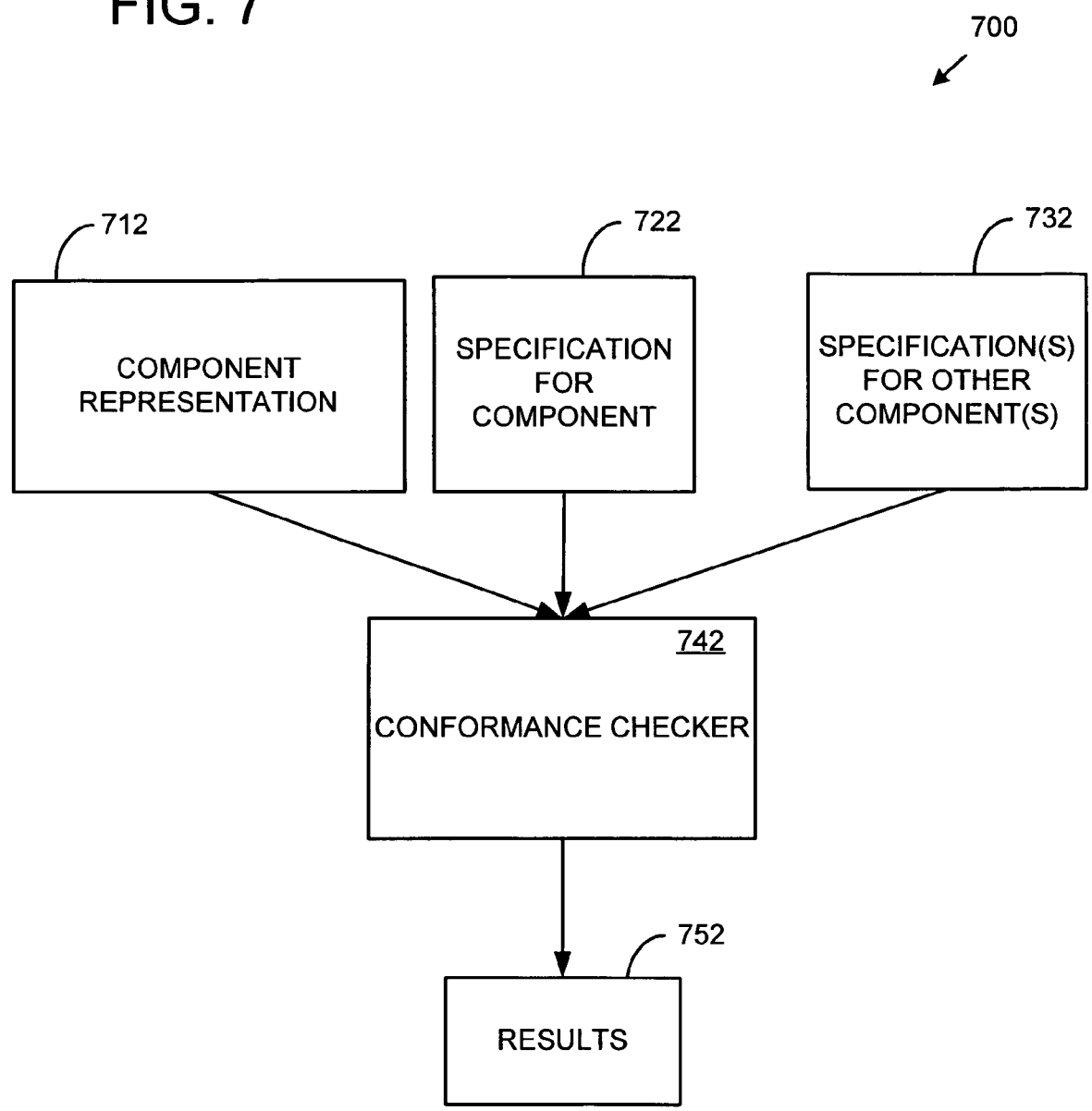
FIG. 7 is a block diagram of an exemplary system for analyzing a distributed software system.

FIG. 7 shows an exemplary system 700 for analyzing a distributed software system, such as that shown in any of the examples herein. The system 700 can itself be implemented as a software system, resulting in an automated analyzer.

In the example, an implementation of a component is checked in conjunction with specifications of externally observable message-passing behavior 732 substituted for the one or more other component(s). In practice, the implementation of the component is first converted to a representation 712; such conversion can be performed by software. If desired, a specification of the externally observable message-passing behavior 722 for the component being tested can also be included.

The component representation 712 and the specifications 732 are checked by a conformance checker 742. In practice, the component representation 712 and the specifications 732 can be combined to form a model, which is checked by the conformance checker 742.

The conformance checker 742 can perform two functions. First, it can determine whether a distributed system comprising the component represented by the representation 712 and other components conforming to their respective specifications will exhibit undesirable behavior (e.g., become stuck). Second, the checker 742 can determine whether the component represented by the representation 712 conforms to its specification 722. The checker 742 can provide appropriate results 752 (e.g., indicating its findings).

Accordingly, if checks are done for the respective components in the system and the conformance checker 742 indicates that respective models representing the system do not exhibit undesirable message-passing related behavior (e.g., is stuck-free), then the model as a whole can be said to be free from the undesirable message-passing related behavior (e.g., is stuck-free). Such checking can be done all at once. Or, components can be checked separately by different entities. For example, a company can certify that its software is stuck-free and conforms to its specification, and other companies can independently test their own software. In this way, the companies can collaboratively test the distributed software system via the specifications, even though none of them has access to the entire application.

EXAMPLE 9

Exemplary Method for Analyzing Software

Figure 8:
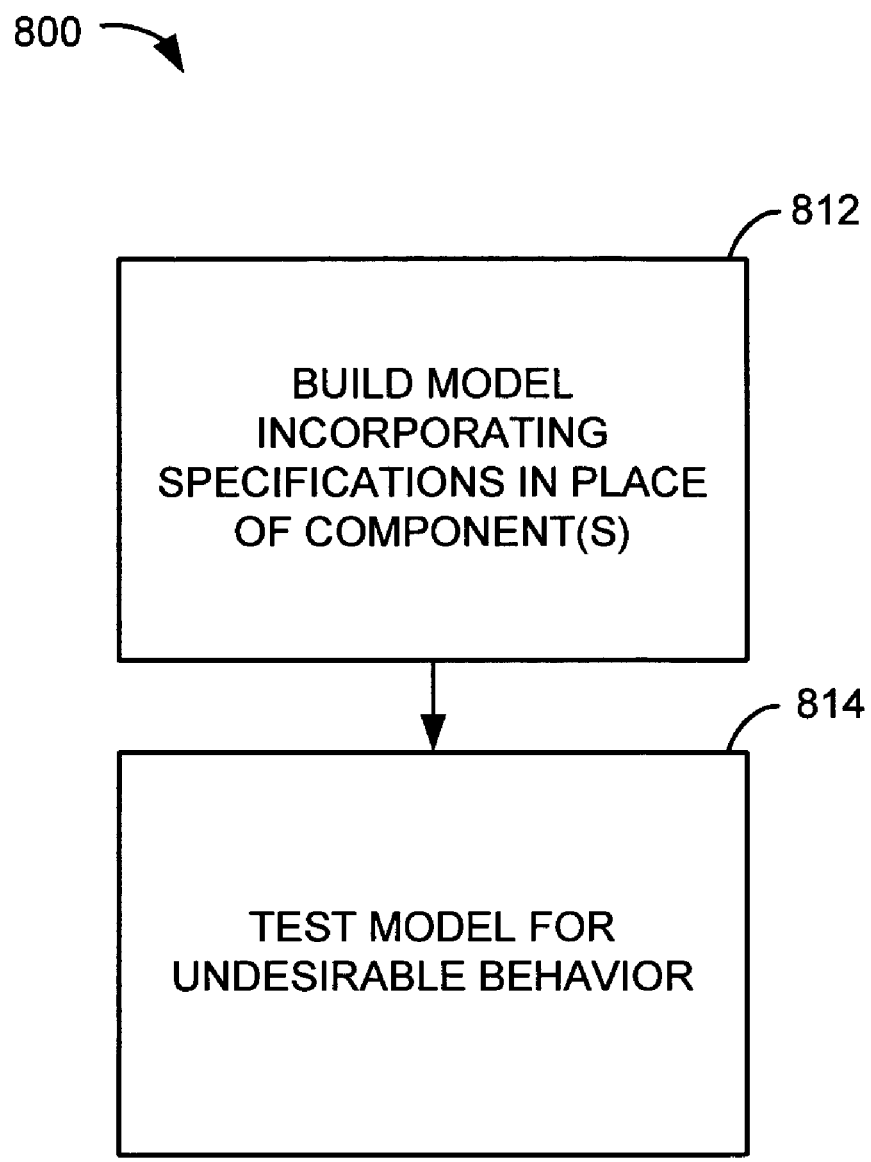
FIG. 8 is a flowchart of an exemplary method for analyzing a distributed software system.

FIG. 8 shows a flowchart of an exemplary method 800 for testing a distributed software system for undesirable behavior. In practice, the method 800 can be repeated for respective components of the distributed software system. The method 800 can be performed by software (e.g., by the system 700 of FIG. 7).

At 812, a model can be built incorporating specifications of externally observable message-passing behavior in place of components. For example, for a component under test, a representation of the component and specifications for components with which the component under test interacts in the distributed system can be combined to form a model.

At 814, the model is tested for undesirable behavior (e.g., whether it becomes stuck). Such tests can be combined with others, such as those shown in FIG. 9. If tests for respective components of the distributed system indicate that they will not exhibit undesirable behavior and the components conform to their respective specifications, then the distributed system as a whole will not exhibit the undesirable behavior.

Thus, the testing can test whether the distributed software system will exhibit undesirable behavior. The testing can substitute one or more specifications in place of the components with which the component under test interacts. The specifications can be accessed by the testing software.

EXAMPLE 10

Exemplary Method for Conformance Checking

Figure 9:
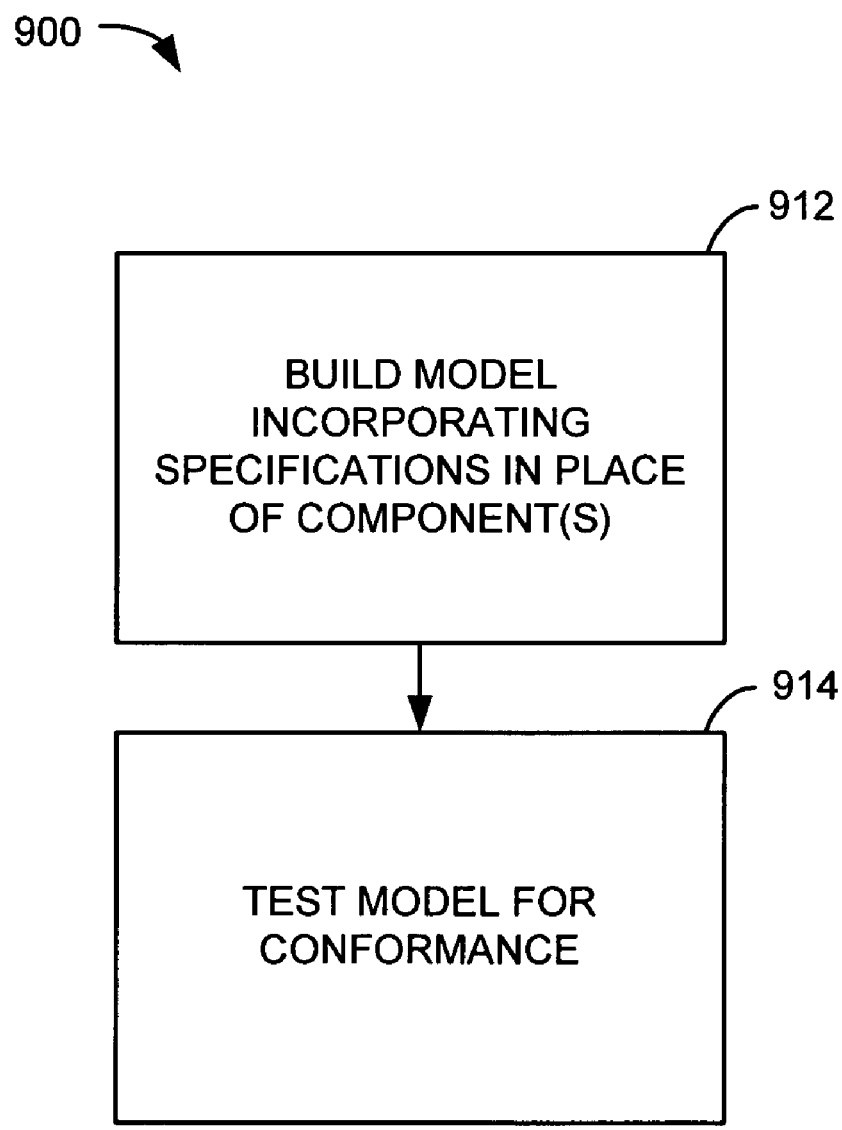
FIG. 9 is a flowchart of another exemplary method for analyzing a distributed software system.

FIG. 9 shows a flowchart of an exemplary method 900 for testing a component of a distributed software system to see if it conforms to a specification of its externally observable message-passing behavior. In practice, the method 900 can be repeated for respective components of the distributed software system. The method 900 can be performed by software (e.g., by the system 700 of FIG. 7).

At 912, a model can be built incorporating specifications of externally observable message-passing behavior in place of components. For example, for a component under test, a representation of the component and specifications for components with which the component under test interacts in the distributed system can be combined to form a model.

At 914, the model can be tested to determine whether the component being tested conforms to its specification. Such tests can be combined with others, such as those shown in FIG. 8. If tests for respective components of the distributed system indicate that they will not exhibit undesirable behavior and that the components conform to their respective specifications, then the distributed system as a whole will not exhibit the undesirable behavior.

EXAMPLE 11

Exemplary Details Regarding Stuck-Freeness in Message-Passing Systems

A message-passing system is considered to be stuck-free if no sent message is ever left unreceived and no process that wants to receive a message waits indefinitely without receiving a message. Stuck-freeness excludes situations where any action is "left over" in the interaction between two processes, either because a message was not received or because a message was not sent. Thus, stuck-freeness excludes deadlock, unreceived messages, and unhandled exception messages. Stuck-freeness is a safety property, and any safety property can, in general, be encoded as stuck-freeness.

In some examples, an interface specification of a message-passing component of a system is sometimes called a "contract." A contract can be thought of as a set of rules or a behavioral type of the component, which is substituted for the component when checking users of the component, thereby opening the door to modular checking of the system. A specification formally states the externally observable message-passing behavior of a component, such as the legal sequences of messages and the types of messages that can be sent or received. Some sequences may not be meaningful, such as sending a payment before a request for payment is received.

Typical error classes include deadlock, mishandling of exceptional situations (e.g., where a client fails to receive and handle an exception message from a service or fails to handle timeout situations correctly), unreceived messages (e.g., where a message is sent at an unexpected time, resulting in the message never being received), and temporal constraint violations (e.g., where a client fails to receive an acknowledgement message or sends requests in the wrong order). These error states (e.g., "bad states") can be referred to as stuck states. Such states are sought to be avoided for successful execution of distributed software systems (e.g., web services). This can only happen when mutual expectations about how and when messages are to be sent and received are honored by both sides of the messages that are passed.

EXAMPLE 12

Calculus of Communicating Systems (CCS)

The Calculus of Communicating Systems (CCS) can be used to facilitate theorems or proofs establishing exemplary functionality of the technology described herein. CCS is an algebraic calculus of parallel computation. The CCS language is a mathematical notational system for communicating processes, a simplified programming language used to express communicating systems. CCS can express both the semantics of parallel programming languages and the behavior of data structures (e.g., RAM, buffer) that serve as interfaces between independent agents.

CCS can facilitate certain mathematical representations. Assumed is a denumerable set of names N={a,b,c, ... }. The set L≜N∪{ā|a∈N} is called the set of commitments. The set A≜L∪{τ} is called the set of actions. Letting α range over A and λ range over $$L, \bar{\bar{a}} = a$$

can be written. CCS processes, ranged over by P, Q, M, I, S ... are defined by:

$P ::= 0 | Z | G_1 + \ldots + G_n | (P|Q) | (va)P | (\mu Z)P$ $G ::= \alpha.P$

The name α is said to be bound in (va)P, and the variable Z is bound in (μZ)P. The free names of P, denoted fn(P), are the names in P that are not bound. Structural congruence, ≡, is the least congruence relation on terms closed under the following rules, together with change of bound names and variables (alpha-conversion) and reordering of terms in a summation:

$$P|0 \equiv P, \; P|Q \equiv Q|P, \; P|(Q|R) \equiv (P|Q)|R \qquad 1$$

$$(va)(P|Q) \equiv P|(va)Q, \; \text{if } a \notin fn(P) \; (va)0 \equiv 0, \; (vab)P \equiv (vba)P \qquad 2$$

$$(\mu Z)P \equiv P[(\mu Z)P/Z] \qquad 3$$

The operational semantics of CCS is given by the labeled transition system:

$$M + \alpha.P + N \xrightarrow{\alpha} P \text{[SUM]} \quad \frac{P \xrightarrow{\lambda} P' \;\; Q \xrightarrow{\overline{\lambda}} Q'}{P|Q \xrightarrow{\tau} P'|Q'} \text{[REACT]} \quad \frac{P \xrightarrow{\alpha} P'}{P|Q \xrightarrow{\alpha} P'|Q'} \text{[PAR]}$$

$$\frac{P \equiv P' \;\; P' \xrightarrow{\alpha} Q' \;\; Q' \equiv Q}{P \xrightarrow{\alpha} Q} \text{[CONG]} \quad \frac{P \xrightarrow{\alpha} P' \;\; \alpha \neq a}{(va)P \xrightarrow{\alpha} (va)P'} \text{[RES]}$$

$P \# Q \triangleq \tau.P + \tau.Q$ is allowed. The difference between $a.P \# b.Q$ and $a.P + b.Q$ is quite important. The former represents internal choice, where the process chooses to transition to $a.P$ or $b.Q$, whereas the latter represents external choice, where the environment controls whether the process moves to P or Q by offering $\overline{a}$ or $\overline{b}$. The distinction between internal and external choice is crucial in our notion of conformance between processes.

$\tilde{a}$ is written as shorthand for a sequence of names $a_1, \ldots, a_n$ (where n is understood or does not matter), and $\tilde{\alpha}$ for a sequence of actions. Transitions in the labeled transition system are extended to sequence of actions, and a set of action sequences in a natural way.

$$P \xrightarrow{\tilde{\alpha}} P'$$

can be written if P can transition to P' by a sequence of transitions labeled with actions from $\tilde{\alpha}$. Formally, if $\tilde{\alpha} = \alpha_0 \cdot \alpha_1 \ldots \alpha_{n-1}$, then $$P \xrightarrow{\tilde{\alpha}} P'$$

if there exist $P_0, P_1, \ldots P_n$ such that $P \equiv P_0$, and for $P' \equiv P_n$ and for $0 \leq i < n$, $$P_i \xrightarrow{\alpha_i} P_{i+1}.$$

For a set of action sequences L, $$P \xrightarrow{L} P'$$

can be written if, for some $\tilde{\alpha} \in L$, $$P \xrightarrow{\tilde{\alpha}} P'.$$

in particular, the notion $$P \xrightarrow{\tau^* \cdot \lambda} P'$$

is used where $\tau^* \cdot \lambda$ denotes the regular set of action sequences $\{\lambda, \tau \cdot \lambda, \tau \cdot \tau \cdot \lambda, \ldots\}$. $P \rightarrow P'$ is written if P can transition to P' using some sequence of actions (where the labels do not matter), and $P^*$ is written to denote the set $\{P' | \rightarrow P'\}$.

$$P \xrightarrow{\tilde{\alpha}}$$

is written to mean that there exists P' such that $$P \xrightarrow{\tilde{\alpha}} P',$$

and $P \rightarrow$ to mean that $$P \xrightarrow{\tilde{\alpha}}$$

for some $\tilde{a}$; $P \not\xrightarrow{}$ can be written, respectively, $P \not\rightarrow$, for the negotiations. P is called an end-state if $P \not\rightarrow$. P is stable when $P \not\xrightarrow{}$. The $\alpha$ notation can include $\alpha$ and $\tau$ actions.

EXAMPLE 13

Exemplary Formal Definitions of Message-Passing Behavior

In order to prove various characteristics of distributed systems, certain formal definitions can be used. For purposes of expository convenience, a component is sometimes referred to as an implementation (I).

For example, processes P and Q can communicate via shared channels $\tilde{a}$. Assuming that no other process shares channels in $\tilde{a}$, the system can be written as $(v\tilde{a})(P|Q)$. Informally, such a system is thought of as stuck if it cannot make any progress, but some part of it is trying to communicate on some or more of the channels in $\tilde{a}$. Consider the following definitions of stuck-freeness, readiness, refusal, and conformance:

TABLE 1

Exemplary Formal Definition of Stuck-freeness

A process P is deemed stuck on $\tilde{a}$ if $(v\tilde{a})P$ is an end-state, and $P \xrightarrow{a} P'$ or $P \xrightarrow{\tilde{a}} P'$ for some $a \in \tilde{a}$.

P is stuck-free on $\tilde{a}$ if there is P' and $\tilde{a}$ such that $P \xrightarrow{\tilde{a}} P'$ with $\tilde{a} \cap \tilde{a} = \emptyset$ and P' is stuck on $\tilde{a}$.

According to the definition, a process P is deemed stuck on a set of names if P itself can make a transition on a name in the set of names, but cannot make any transition whatsoever if it is only allowed to do internal communication on the names in the set. Therefore, P cannot itself complete communication on a name in the set. Such a situation is regarded as undesirable if the names in the set are local to P, because it signals that P cannot finish communication on the names in the set, because either some component of P is waiting to receive a message that will never arrive or it is sending a message that will never be received.

TABLE 2

Exemplary Formal Definition of Readiness and Refusal

If Y is a set containing a single label λ or Y is the empty set, then it can be said that P is ready on Y if P is stable and λ ∈ Y implies $P \xrightarrow{\lambda} P'$ for some P'. If X is a set of labels, it can be said that P refuses X if P is stable and for all λ in X, $P \not\xrightarrow{\lambda}$. It can be said that P can refuse X while ready on Y if there exists P' such that P → P' and P' refuses X and is ready on Y.

According to the definitions, if X is a set of labels and Y is either the empty set or a set consisting of one name, then it can be said that P can refuse X while ready on Y if, and only if, P can transition to a state P' doing only internal communication such that P' can make no further internal communication, and P' cannot do any action that complements the labels in X and at the same time, if Y contains a name, then P' can do an action on that name.

TABLE 3

Exemplary Formal Definition of Conformance

Conformance is the largest reflexive relation ≦ such that, whenever P ≦ Q, then the following conditions hold:

[C1]. If $P \xrightarrow{\tau^*\lambda} P'$ then for some Q', $Q \xrightarrow{\tau^*\lambda} Q'$ and

P' ≦ Q'

[C2]. If P can refuse X while ready on Y, then Q can refuse X while ready on Y.

According to the definition, P conforms to Q if and only if there exists a relation R containing the pair (P,Q) such that R satisfies the following two conditions for all pairs (S,T) in R:

[C1] Whenever S can transition to S' by first performing an arbitrary (possibly empty) sequence of internal communications (e.g., τ moves) and then performing an action, then T can transition to a state T' by first performing an arbitrary (possibly empty) sequence of internal communications and then performing the same action, where the pair (S',T') is again a member of the relation R.

[C2] If P can refuse a set X while ready on a set Y (where Y is either empty or contains a single name), then Q can also refuse X while ready on Y.

When considering if P≦Q, P is often thought of as an implementation process and Q as a contract. Condition [C1] says that conformance is a form of weak simulation (R. Milner: *Communicating and mobile systems: the π-calculus*, Cambridge University Press 1999). Condition [C2] is a contra-variant condition, which allows a contract to require behavior of the implementation. In reading condition [C2], it is important to recall that the definition of internal choice, P#Q=τ.P+τ.Q, implies that an internal choice is inherently unstable until a choice is made. For example, it is true that a+b≦a#b, but it is not true that a#b≦a+b.

A process of the form P#Q is a process whose next step (either P or Q) is decided by the process itself. In contrast, a process of the form P+Q is a process whose next step is decided by the environment (e.g., whatever the process is communicating with). For example, if a.P is receiving message a and b.Q is receiving message b, then a.P+b.Q will choose a.P if the environment sends message a first, and it will choose b.Q if the environment sends message b first.

Conformance of an implementation I to a contract C can fail for essentially two different reasons. First, failure may happen due to violation of [C2], because the implementation refuses to do something promised by the contract. Second, failure may happen because the contract does not cover all the behavior of the implementation, as required by condition [C1]. As examples of failures of the first kind, consider the following cases of I⋠C, where C is a contract for a service implementation I. In the examples, the "?" notation indicates expected messages, and the "!" notation indicates sent messages.

a?⋠a?+b?. A client believing the contract C=a?+b? may try to send a message b, which is not received by the implementation I=a? (client message loss).

a!⋠a!.b!. A client believing C might first wait for a message a and then wait for a message b. However, I never sends b, so the client is stuck (deadlocked).

Examples of failures of the second kind include:

a?.b?⋠a?. A client believing C might send a and then stop, leaving the service I stuck (deadlocked) waiting for b.

a!.b!⋠a!. A client believing C might receive a and then stop, leading to the b message being lost (service message loss).

When interpreting contracts using conformance, a contract C typically expresses requirements and promises to both the implementation I and its clients. For example, the contract a! requires I to send a and promises a to the environment; but it also requires the environment to receive a. Importantly, conformance allows contracts to be more non-deterministic than implementations. For example, a!⋠a!#b! does not violate [C2] since a stable derivative of C can be found (namely a!), satisfying the requirement [C2]. Consider the following theorem:

TABLE 4

Exemplary Theorem of Substitutability

Theorem 1 - Let I and C be any CCS processes. If I ≦ C, then for any process P, if (P | C) is stuck-free on ã, then (P | I) is stuck-free on ã.

EXAMPLE 14

Exemplary Conformance

The disclosed technology may begin its conformance check by analyzing a system using a contract (C) in place of a service and an environment (E) in place of the client. A test is run to determine if E|C is stuck-free. The conformance checker can then analyze the conformance of an implementation (I) in place of the contract. In such a case conformance checking can include whether I obeys the rules set up for it in C and whether E|C is stuck-free. If I conforms to C and E|C is stuck-free, then it can be said that E|I is stuck-free.

The message-passing moves that take place through channels behind a component being tested are considered to be τ moves because they are internal transactions.

In comparison with other refinement relations for concurrent processes, conformance as defined in Table 3 and the assurance of properties that stem therefrom (e.g., substitutability of Theorem 1) are different. In many cases, the difference is caused by the readiness constraint in condition [C2], described above.

For example, in the stable failures refinement in C. A. R. Hoare, *Communicating Sequential Processes*, Prentice Hall 1985 ("CSP"); and A. W. Roscoe, *The Theory and Practice of Concurrency*, Prentice Hall 1998, a process may refine another, even though Theorem 1 does not hold. For example, under CSP, the process a refines the process a+τ.0 (where 0 is the inactive process that does nothing). However, there is not a≦a+τ.0 because condition [C2] fails to be satisfied by these processes: the process a refuses {a} while ready on {a}, but the process a+τ.0 can only refuse {a} from the state 0 (which is the only stable derivative of a+τ.0), and in this state (namely the state 0) the process is not ready on {a}. Indeed, the process a is stuck on {a}, but the process a≦a+τ.0 cannot get stuck at all, since its only stable derivative is 0 which is not a stuck process. Therefore, Theorem 1 is not true of stable failures refinement. The difference between stable failures refinement in CSP and the notion of conformance as defined in Table 3 stems from the fact that the notion of stuckness is different from the notion of deadlock in CSP.

Another refinement relation is Iain Phillips' theory of refusal testing (I. Phillips, *Refusal Testing*. Theoretical Computer Science 50(2), 241-284). Under refusal testing, a process may not be defined as refining another, even though Theorem 1 holds.

For example, if P is the process P=(a+b.c)#(c+b.a), and Q is the process Q=(a+b.a)#(c+b.c), then it can be seen that P is not a refinement of Q in refusal testing, but it is the case that P refines Q according to the definition of conformance of Table 3 because P≦Q. Thus, Theorem 1 holds, but refusal testing does not detect a refinement relationship.

EXAMPLE 15

Exemplary Language (BPEL)

BPEL4WS (Business Process Execution Language for Web Services), or BPEL, is an XML-based language designed to enable task-sharing for a distributed computing or grid computing environment—even across multiple organizations—using a combination of Web services. In any of the examples herein, BPEL can be used for storing specifications of externally observable message-passing behavior. Using BPEL, a programmer can formally describe a business process that will take place across the Web in such a way that any cooperating entity can perform one or more steps in the process the same way. In a supply chain process, for example, a BPEL program may describe a business protocol that formalizes what pieces of information a product order consists of, and what exceptions may have to be handled. One of the main focus points of BPEL is to provide a structured way to specify and program the interactions between concurrent components via message-passing, typically over the Internet.

EXAMPLE 16

Exemplary Language (ZING)

Common programming languages (e.g., C, Java, and C#) have several features that are clumsy to model with CCS, such as procedure calls, pointers, shared memory, exceptions, and objects. Therefore, a different language called "ZING" has been created to support such features directly without the need for complicated encodings. Programs can be represented in ZING, and the properties for CCS (e.g., substitutability) still hold. Thus, ZING can be used in any of the examples herein to represent components, and a conformance checker can itself be expressed via ZING. The Backus-Naur Form (BNF) for ZING can include the following:

| | | |
|---|---|---|
| T ::= | int \| bool \| chan T \| Id | Types |
| D ::= | class Id {$M_1 \ldots M_n$ $F_1 \ldots F_m$} | Class declaration |
| M ::= | $mm_1 \ldots mm_k$ Id($T_1$ $x_1, \ldots, T_n$ $x_n$) B | Method |
| mm ::= | activate \| atomic \| static | |
| F ::= | $fm_1 \ldots fm_k$ T x | Field |
| fm ::= | Static \| external \| in \| out | |
| B ::= | {$S_1; \ldots; S_n$} | Block |
| S ::= | $e_1 = e_2$ | Assignment |
| | If(e) $S_1$ else $S_2$ | Conditional |
| | l:S | Labeled Statement |
| | goto l | Goto |
| | B | Sequential Composition |
| | e.f($e_1, \ldots, e_n$) | Synchronous procedure call |
| | Async e.f($e_1, \ldots, e_n$) | Asynchronous procedure call |
| | Send ($e_1, e_2$) | Nonblocking send |
| | Select{$J_1$ -> $S_1, \ldots J_n$ -> $S_n$} | Blocking select |
| | choose C | Nondeterministic choice |
| | atomic B | Atomic block |
| | try B with $W_1 \ldots W_n$ | Try catch |
| | raise x | Raise exception |
| | T x | Local variable declaration |
| E ::= | c \| x \| e.x \| new T \| unop e \| $e_1$ binop $e_2$ | |
| W ::= | x -> S \| * -> S | |
| J ::= | Receive($e_1, e_2$) \| wait(e) \| timeout | |
| C ::= | T \| Range | |

The data types supported by ZING include int, bool, channels, and user defined classes. A ZING model consists of a set of class declarations D. Each class declaration has a sequence of method declarations M and field declarations F. Methods can optionally be tagged as static, activate, or atomic. A static method can be invoked from a class directly (without the need for instantiating any object of the class) and can access only static fields of the class. A static method that is also marked activate executes as a separate process in the initial state of the model. An atomic method is specified to execute atomically without any interleavings by other processes. The body of a method is a sequence of statements and procedure calls to encode usual computation and control. In addition to sequential procedure calls, ZING supports asynchronous procedure calls where the called procedure runs in a new process, and the caller returns immediately to the continuation of the call.

ZING supports channels with non-blocking sends and blocking receives. A process can wait for one of several receives through a select statement. The select statement also supports waiting for an arbitrary predicate to become true. A nondeterministic construct called choose can be used to nondeterministically pick an element out of a finite set of integers or enumeration values. Sequences of ZING statements may be able to be bracketed as atomic. This is essentially a directive to ignore interleavings with other processes while any given process executes an atomic sequence. Exception handling is supported using trycatch. If an exception is raised, the stack is automatically unwound until a matching handler is found.

EXAMPLE 17

Exemplary Implementation of Conformance Checker

In any of the examples herein, the conformance checker can take the following as input: specifications of externally observable message-passing behavior in BPEL, and a representation of a component in ZING (e.g., converted from any language such as C#, XLANG, VB, and the like).

EXAMPLE 18

Exemplary Conformance Checker Built in Zing

The ZING compiler compiles ZING programs into a ZING object model (ZOM) that is used to perform various tasks such as model checking and conformance checking. The ZOM has one object of type State, which captures the state of the entire ZING program. The interface of the State class provides the following methods and properties to query details of the state and execute transitions from the state.

For a State S, the method S.GetNextSuccessor( ) returns the next successor of S. By iteratively calling this method, all successors of S can be generated. For a newly generated state S, the ExternalEvent property gives the event on the transition that was used to generate S. After all outgoing transitions of a state have been explored, the AccumulatedExternalEvents property gives an array of all events from all such transitions. The conformance checker can be built on top of the ZOM. An exemplary algorithm is as follows:

```
Stack dfsStack;
Hashtable stateHash;
void addState (State I, State S) {
    StatePair combinedState = new StatePair(newI, newS);
    if (!stateHash.Contains(combinedState)) {
        stateHash.Add(combinedState);
        dfsStack.Push(combinedState);
    }
}
void doDfs(State initialImplState, State initialSpecState) {
    addState}(initialImplState, initialSpecState);
    while (dfsStack.Count >= 1) {
        StatePair P =(StatePair) dfsStack.Peek}( );
        State I = P.first( );
        State S = P.second( );
        State newI = I.GetNextSuccessor( );
        if (newI == null) {
            if (isStable(I)){
                // First get all the events we executed from I.
                ExternalEvent[ ] IEvents = I.AccumulatedExternalEvents;
                // Check if ready-refusals of I are ready-refused by S as well.
                for(int i = 0; i < IEvents.Count; i++) {
                    if(!checkReadyRefusals(S, IEvents, IEvents[i])) {
                        Console.WriteLine("Ready refusals do not match up");
                        return;
                    }
                }
            }
            dfsStack.Pop( );
            continue;
        }
        ExternalEvent event = newI.ExternalEvent;
        // Try to produce a transition from newS with "event" as the
        observable event.
        State newS = executeWithEvent(S, event);
        if (newS == null) {
            Console.WriteLine("Implementation has unspecified
            behavior"); \\
                return;
        }
        addState(newI, newS);
    }
    Console.WriteLine("I conforms with S");
}
```

It is assumed that the contract does not have hidden nondeterminism (e.g., for a contract state S, if $$S \xrightarrow{\tau^*\lambda} S_1$$

and $$S \xrightarrow{\tau^*\lambda} S_2$$

are implied, then $S_1 \equiv S_2$. This assumption can be relaxed by determinizing the contract in a pre-processing step, or on-the fly using a subset construction.

The conformance checker might do a depth-first-search on the state-space of the implementation and track the "matching" state of the contract corresponding to each state of the implementation. A hash table is used to keep track of states that have been already visited. In the exemplary implementation, fingerprints of the visited states might be stored in the hash tables for efficiency. At each transition explored in the implementation, the algorithm might check for condition [C1], described above. After all the successors of an implementation state have been explored, it is popped from the DFS stack. At that time, the algorithm might check to see if condition [C2] holds.

The exemplary algorithm uses three functions: executeWithEvent, is Stable, and checkReadyRefusals. The semantics of these three functions is described below:

The function executeWithEvent searches the contract for a state which can be obtained by transitioning through the given event. Formally, executeWithEvent(S, λ) returns a state S' such that $$S \xrightarrow{\lambda} S',$$

if such a state S' exists (note that such a state is unique if it exists due to the assumption that the contract does not have hidden nondeterminism). If the function returns null, it can be concluded that condition [C1] has been violated.

The function is Stable returns true if the given state S is stable and false otherwise.

The function checkReadyRefusals(S, X, e) returns true if condition [C2] holds. More precisely, checkReadyRefusals(S, X, e) returns true if and only if there exists a stable S' such that (i) t $$S \xrightarrow{\tau^*} S'$$

and (ii) for all λ, if $$S' \xrightarrow{\lambda}$$

then λ∈X, and (iii)

$$S' \xrightarrow{e}.$$

The algorithm terminates if the state space of the implementation is finite, and the complexity is linear in the state spaces of the implementation and the contract. If the state space of the implementation is too large or infinite, the algorithm can be used to check for conformance in whatever portion of the state space is explored.

EXAMPLE 19

Exemplary BPEL Programs and ZING Models

BPEL specifications and programs are usually authored using tools that generate XML format. Consider the process definition for a ShoppingCartService, which forms part of a larger system that implements a bookstore order service and inventory management system, as shown at the end of this Detailed Description. The overall structure of the process is a set of event-loops, which receive messages from the client of the ShoppingCartService and, depending on the message stimuli from the client, interacts with the two other services in various ways. In addition, the process does internal processing after each message by invoking local methods.

The most important instructions used are the constructs for message-passing and synchronization, receive, invoke, and pick. The instruction receive (ShoppingCartIn, AddItem, createInstance), used in line 5 of the algorithm, is a blocking message received that waits for a message of type AddItem to arrive on the port named ShoppingCartIn. The createInstance argument means that a new instance of the ShoppingCartService is created upon receipt of the AddItem message. The invoke instruction is an asynchronous message send. For example, the instruction invoke (InventoryReservationIn, ReserveInventory), used in lines 7-8 of the algorithm, sends a ReserveInventory message to the InventoryReservation service. The asynchronous send is non-blocking.

The pick instruction is a blocking message receive construct, which waits to receive one of a set of message types, as specified in the list of on Message choices following the pick. For example, lines 12-105 of the algorithm span a single pick, which waits for messages of either type AddItem, RemoveItem, CheckOut, Cancel, or onAlarm. The first message of one of those types to arrive will trigger the pick to choose receipt of that message, and the entire pick is thereby consumed. Actions following the receipt of a message of the appropriate type are specified within brace { . . . } after each on Message case. For example, lines 26-51 of the algorithm contain the action associated with receipt of the CheckOut message, which encompasses a nested pick. Lines 72-104 end the pick by specifying the special event onAlarm, which is an internal timer event attached to the pick to specify timeout for the blocking receive. In case the timeout event arrives, the continuation of onAlarm (lines 73-104) handshakes with the client to terminate the session after consuming possible outstanding messages from the client.

In one embodiment, a translator from BPEL (in its native XML format) is implemented in ZING models. Such a translation is amenable because BPEL programs clearly identify the occurrence and structure of message-passing operations and also because message-passing operations in BPEL cannot be nested inside local methods (rather, local methods are called by invoking them as services). As a result, the message-passing control structure, which is needed for conformance checking, is exposed at the top level of the BPEL process.

Let p be a BPEL port (e.g., ShoppingCartIn or InventoryReservationOut) carrying messages of types $M_1, \ldots, M_k$ (e.g., AddItem, RemoveItem, or CheckOut). Then p is represented in the ZING model by a set of channels $c_{M_1}, \ldots, c_{M_k}$, one for each message type. These channels are bundled together as fields in a ZING object p. The BPEL receive instruction, receive (p, $M_i$), gets translated into ZING as select {receive (p.$c_{M_i}$,_)}. Here, _ is a dummy variable (ZING receive requires a data item to be received). A pick of the form pick {onMessage(p, $M_1$){ . . . } . . . onMessage(p, $M_k$){ . . . }} becomes in ZING:
 select{receive(p.cM$_1$,-)→{ . . . } . . .
   receive (p.CM$_k$,-)→{ . . . }}

Asynchronous sends, of the form invoke(p, $M_i$), translate into atomic{select{wait(        sizeof (p.cM$_1$)== 0
                         && . . . &&
                         sizeof(p.cM$_k$)== 0) -> ;}}
send(cM$_i$, true)}

The purpose of the initial select is to limit queue sizes to size 1. In general, BPEL requires queued semantics for asynchronous communication, but it does not specify the exact nature of queues. The translation from BPEL to ZING preserves information about which channels are external and which channels are internal. External channels are given commitment-based semantics in ZING, and actions over them are labeled with the name of the channel. Internal channels are given reaction-based semantics in ZING, and actions over them are labeled with τ.

EXAMPLE 20

Exemplary Execution

Figure 10:
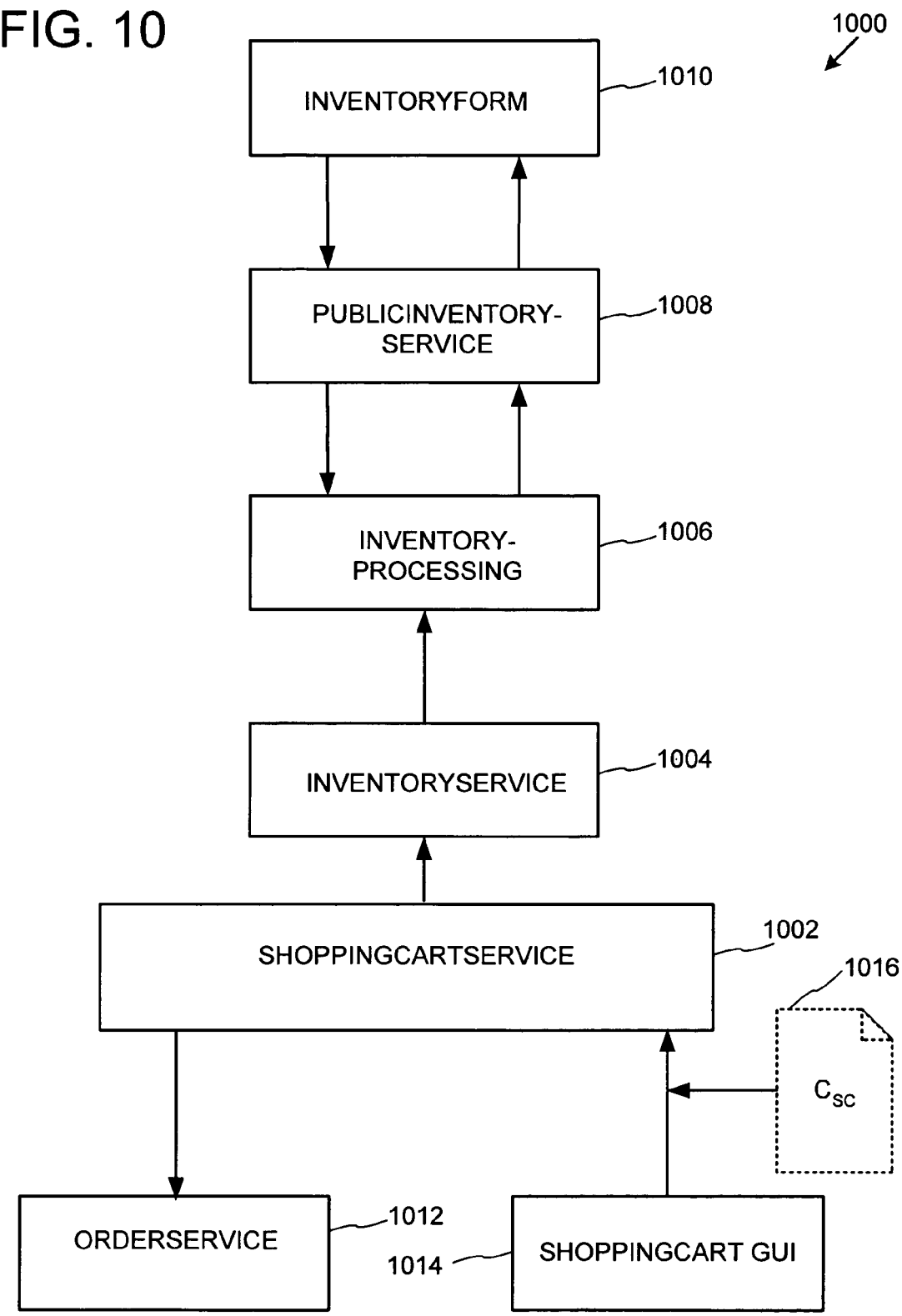
FIG. 10 is a structural diagram of an exemplary embodiment of a system used for managing online sales, inventory, and ordering processes for a bookstore system.

In one embodiment, a system called Bookstore is used for managing online sales, inventory, and ordering processes for a bookstore. FIG. 10 is a structural diagram of the Bookstore system 1000. The system contains five service components: ShoppingCartService 1002, InventoryService 1004, OrderService 1012, PublicInventoryService 1008, and InventoryProcessing 1006. The system also contains two user interface processes: InventoryForm 1010 and ShoppingCart GUI 1014. Each of the five services has an associated contract, which is a specification of the publicly visible message-passing behavior of the service. In FIG. 10, each contract is named in association with the service it specifies. An exemplary contract named ShoppingCart 1016 could be depicted as follows (e.g., in BPEL):

```
bool exitLoop = false;
bool gotTimeoutAck =false;
receive(ShoppingCartIn,AddItem,createInstance);
while (!exitLoop)
{
  Pick
  {
    onMessage(ShoppingCartIn,AddItem)
    onMessage(ShoppingCartIn,RemoveItem)
    onMessage(ShoppingCartIn,CheckOut)
    {
      invoke(ShoppingCartOut,AcknowledgeOrder);
      exitLoop = true;
    }
    onMessage(ShoppingCartIn,Cancel)
    {
      invoke(ShoppingCartOut,AcknowledgeOrder);
      exitLoop = true;
    )
    onAlarm
    {
      invoke(ShoppingCartOut,Timeout);
      while (!gotTimeoutAck)
```

-continued

```
{
    pick
    {
        onMessage(ShoppingCartIn,AddItem)
        onMessage(ShoppingCartIn,RemoveItem)
        onMessage(ShoppingCartIn,CheckOut)
        onMessage(ShoppingCartIn,Cancel)
        onMessage(ShoppingCartIn,TimeoutAck)
        {
            gotTimeoutAck = true;
        }
    }
  }
  exitLoop = true;
 }
 }
}
```

Conformance analysis of the Bookstore system may be performed by compiling each service implementation and its associated contract into ZING, resulting in two ZING processes, which can then be compared using a conformance checker. Such a process may be fully automatic. The conformance check is performed compositionally, which means that each component is analyzed one at a time and only contracts are used for services when building client models. For example, the ShoppingCartService 1002 is a client of two other services, InventoryService 1004 and OrderService 1012. In one embodiment, only the associated contracts may be used to represent the services when compiling a ZING model for the ShoppingCartService 1002. The contract for a service discards all internal computation. For example, the ShoppingCart contract 1016 does not mention the interactions between the ShoppingCartService 1002 and the two services it is a client of. Thus, this method avoids a combinatorial explosion of interactions between multiple components.

The conformance analysis reports three kinds of errors, which are derived from the definitions of conformance (Table 3) and stuck-freeness (Table 1): simulation failures (e.g., violations of [C1]), refusals failures (e.g., violations of condition [C2] of the definition of conformance), and stuckness (e.g., a process gets stuck during conformance check).

When running the conformance check, the service implementation is found to get stuck with the InventoryService 1004, which is represented by the model by ZING processes for its contract. The error trace generated by ZING shows that a deadlocked state can be reached when the ShoppingCartService 1002 receives a CheckOut message from its client (line 27 of the algorithm discussed above). In this case, there is a reachable state in which the InventoryService 1004 has timed out, when the ShoppingCartService 1002 has sent a CommitReservation message to the InventoryService 1004 (lines 29-30 of the above algorithm). The ShoppingCartService 1002 then gets stuck at the receive operation at line 32, waiting for an InventoryAcknowledgement message to arrive from the InventoryService 1004 (which will never arrive because the service has timed out). The error here is that the ShoppingCartService 1002 does not take the timeout possibility into account, by allowing for an InvTimeout message as well (as specified in its contract, the InventoryService 1004 sends such a message when a timeout occurs).

A number of other errors in the ShoppingCartService were discovered, including a simulation failure, non-determinism, and several refusals failures. First, the initial version of the InventoryReservation contract failed to specify that the service could timeout on its event loop. This resulted in a refusals failure identified by the conformance checker because the service would refuse all requests after timing out. Second, the InventoryReservation specifies that the service takes message CommitReservation only once, terminating the event loop of the service, but the service implementation did not terminate its loop upon receipt of CommitReservation. Third, the input RemoveItem specified in the contract but not implemented results in a refusals failure. Fourth, the service PublicInventoryService subscribes to a publish-subscribe system, implemented in the InventoryProcessing service. On the port connecting it to the publish-subscribe system, it is required by its contract to be receptive of the message types that can be generated by the publish-subscribe system. The conformance checker generated a refusals failure whose error indicated that, on receipt of message Done in its service event loop, the service PublicInventoryService would exit its event loop without terminating communication with the publish-subscribe system. Messages for that system could therefore be lost. Finally, an initial version of the ShoppingCart contract turned out to have a hidden non-deterministic choice. While there may be cases where hidden non-determinism is useful in contracts, it is often better eliminated and sometimes reflects undesired specifications.

EXAMPLE 21

Exemplary Computing Environment

Figure 11:
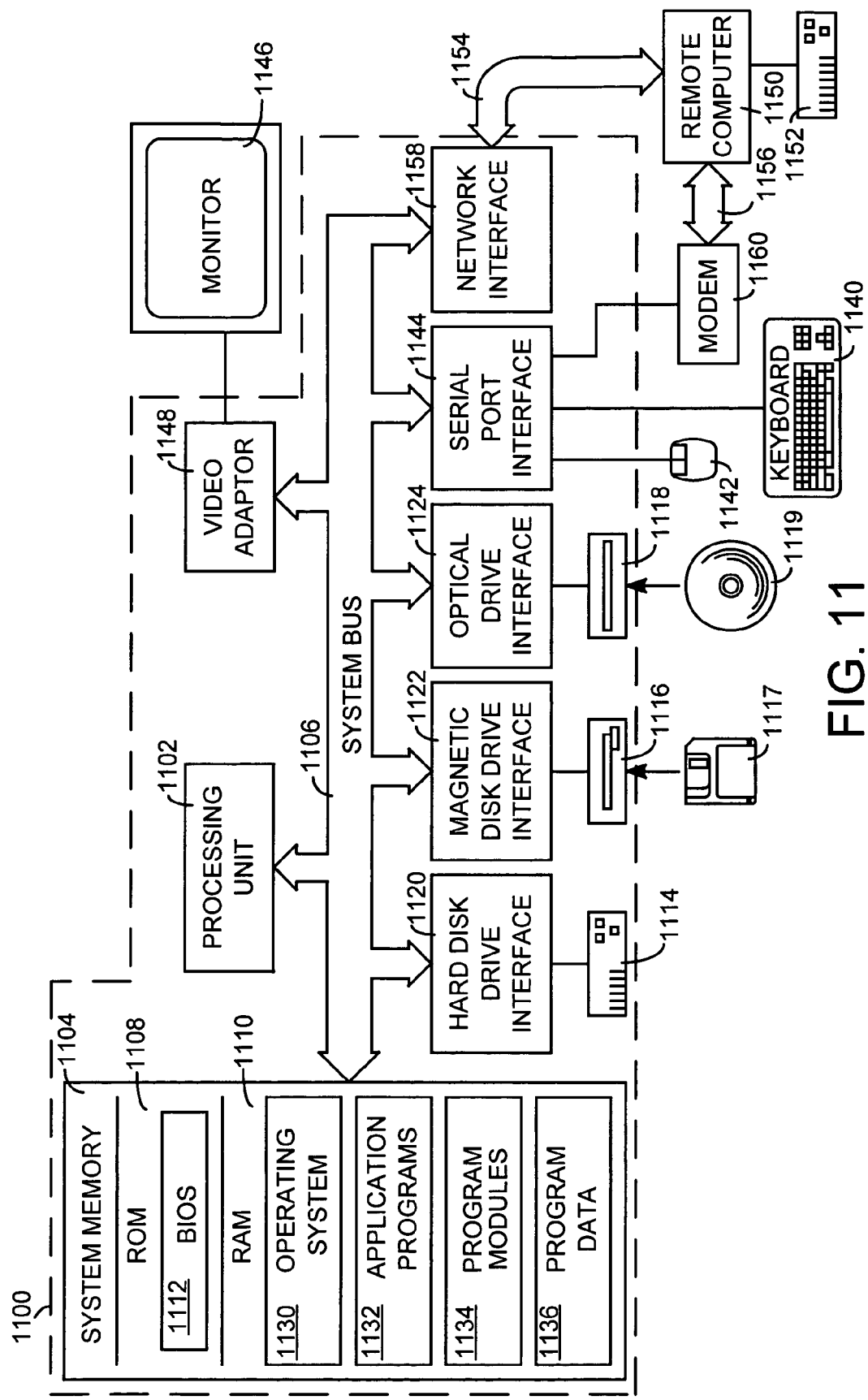
FIG. 11 is a diagram depicting an exemplary computing environment in which the disclosed technology may be implemented.

FIG. 11 and the following discussion are intended to provide a brief, general description of an exemplary computing environment in which the disclosed technology may be implemented. Although not required, the disclosed technology will be described in the general context of computer-executable instructions, such as program modules, being executed by a personal computer (PC). Generally, program modules include routines, programs, objects, components, data structures, etc. that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 11, an exemplary system for implementing the disclosed technology includes a general purpose computing device in the form of a conventional PC 1100, including a processing unit 1102, a system memory 1104, and a system bus 1106 that couples various system components including the system memory 1104 to the processing unit 1102. The system bus 1106 may be any of several types of bus structures including a memory bus or memory controller, a peripheral bus, and a local bus using any of a variety of bus architectures. The system memory 1104 includes read only memory (ROM) 1108 and random access memory (RAM) 1110. A basic input/output system (BIOS) 1112, containing the basic routines that help with the transfer of information between elements within the PC 1100, is stored in ROM 1108.

The PC 1100 further includes a hard disk drive 1114 for reading from and writing to a hard disk (not shown), a magnetic disk drive 1116 for reading from or writing to a removable magnetic disk 1117, and an optical disk drive 1118 for reading from or writing to a removable optical disk 1119 (such as a CD-ROM or other optical media). The hard disk drive 1114, magnetic disk drive 1116, and optical disk drive 1118 are connected to the system bus 1106 by a hard disk drive interface 1120, a magnetic disk drive interface 1122, and an optical drive interface 1124, respectively. The drives and their associated computer-readable media provide nonvolatile storage of computer-readable instructions, data structures, program modules, and other data for the PC 1100. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored on the hard disk, magnetic disk 1117, optical disk 1119, ROM 1108, or RAM 1110, including an operating system 1130, one or more application programs 1132, other program modules 1134, and program data 1136. A user may enter commands and information into the PC 1100 through input devices such as a keyboard 1140 and pointing device 1142 (such as a mouse). Other input devices (not shown) may include a digital camera, microphone, joystick, game pad, satellite dish, scanner, or the like. These and other input devices are often connected to the processing unit 1102 through a serial port interface 1144 that is coupled to the system bus 1106, but may be connected by other interfaces such as a parallel port, game port, or universal serial bus (USB). A monitor 1146 or other type of display device is also connected to the system bus 1106 via an interface, such as a video adapter 1148. Other peripheral output devices, such as speakers and printers (not shown), may be included.

The PC 1100 may operate in a networked environment using logical connections to one or more remote computers, such as a remote computer 1150. The remote computer 1150 may be another PC, a server, a router, a network PC, or a peer device or other common network node, and typically includes many or all of the elements described above relative to the PC 1100, although only a memory storage device 1152 has been illustrated in FIG. 11. The logical connections depicted in FIG. 11 include a local area network (LAN) 1154 and a wide area network (WAN) 1156. Such networking environments are commonplace in offices, enterprise-wide computer networks, intranets, and the Internet.

When used in a LAN networking environment, the PC 1100 is connected to the LAN 1154 through a network interface 1158. When used in a WAN networking environment, the PC 1100 typically includes a modem 1160 or other means for establishing communications over the WAN 1156, such as the Internet. The modem 1160, which may be internal or external, is connected to the system bus 1106 via the serial port interface 1144. In a networked environment, program modules depicted relative to the personal computer 1100, or portions thereof, may be stored in the remote memory storage device. The network connections shown are exemplary, and other means of establishing a communications link between the computers may be used.

Web Services

In any of the examples herein, the technologies can be used for a distributed web-based application using web services. In such an approach, the components can be individual web services or other components of the system.

Software Implementations

Any of the methods described herein can be accomplished by computer-executable instructions (e.g., stored on one or more computer-readable media). In this way, automated operation can be achieved.

Alternatives

The technologies from any example can be combined with the technologies described in any one or more of the other examples. In view of the many possible embodiments to which the principles of the invention may be applied, it should be recognized that the illustrated embodiments are examples of the invention and should not be taken as a limitation on the scope of the invention. Rather, the scope of the invention includes what is covered by the following claims. We therefore claim as our invention all that comes within the scope and spirit of these claims.

ShoppingCartService Process Definition (discussed in Example 19 above, and provided here pursuant to MPEP 608.05(a))

```
1   bool exitLoop;
2   bool gotTimeoutAck;
3   bool commitOK;
4
5   receive(ShoppingCartIn,AddItem,createInstance)
6   {
7     invoke(InventoryReservationIn,
8         ReserveInventory);
9     exitLoop=false;
10    while (!exitLoop)
11    {
12      pick
13      {
14        onMessage(ShoppingCartIn,AddItem)
15        {
16          invoke(InventoryReservationIn,
17              ReserveInventory)
18        }
19        onMessage(ShoppingCartIn,RemoveItem)
20        {
21          invoke(InventoryReservationIn,
22              UnreserveInventory)
23        }
24        onMessage(ShoppingCartIn,CheckOut)
25        {
26          invoke(InventoryReservationIn,
27              CommitReservation);
28          pick
29          {
30            onMessage(InventoryReservationOut,
31                InventoryAcknowledgement)
32            {
33              commitOK =
34                  InventoryAcknowledgement.result;
35            }
36          }
37          switch
38          {
39            case commitOK:
40            {
41              invoke(OrderingIn,
42                  BookPurchaseOrder);
43
44              receive(OrderingOut,
45                  OrderingAcknowledgement);
46            }
47          }
48          invoke(ShoppingCartOut,
49              AcknowledgeOrder);
```

-continued

```
50            exitLoop=true;
51          }
52          onMessage(ShoppingCartIn,Cancel)
53          {
54            invoke(InventoryReservationIn,
55                CancelReservation);
56            pick
57            {
58              onMessage(InventoryReservationOut,
59                  InventoryAcknowledgement){ }
60              onMessage(InventoryReservationOut,
61                  InvTimeout)
62              {
63                invoke(InventoryReservationIn,
64                    InvTimeoutAck)
65              }
66            }
67            invoke(ShoppingCartOut,
68                AcknowledgeOrder);
69
70            exitLoop=true;
71          }
72          onAlarm
73          {
74            invoke(InventoryReservationIn,
75                Cancel Reservation);
76            pick
77            {
78              onMessage(InventoryReservationOut,
79                  InventoryAcknowledgement){ }
80              onMessage(InventoryReservationOut,
81                  InvTimeout)
82              {
83                invoke(InventoryReservationIn,
84                    InvTimeoutAck)
85              }
86            }
87            invoke(ShoppingCartOut,Timeout);
88            gotTimeoutAck=false;
89            while (!gotTimeoutAck)
90            {
91              pick
92              {
93                onMessage(ShoppingCartIn, AddItem){ }
94                onMessage(ShoppingCartIn, RemoveItem){ }
95                onMessage(ShoppingCartIn, CheckOut{ }
96                onMessage(ShoppingCartIn, Cancel){ }
97                onMessage(ShoppingCartIn,TimeoutAck)
98                {
99                  gotTimeoutAck=true;
100               }
101             }
102           }
103           exitLoop=true;
104         }
105       }
106     }
107 }
```

We claim:

1. One or more computer-readable storage media having computer-executable instructions for causing a computer to perform the following to determine whether a distributed software system having a component and one or more other concurrently executable components operable to communicate via message passing over a network will exhibit undesirable behavior:

reading from one or more computer-readable storage media one or more specifications of externally observable message-passing behavior for the one or more other concurrently executable components;

testing whether the distributed software system will exhibit the undesirable behavior, wherein the testing comprises using the one or more specifications in place of the one or more other concurrently executable components and building a model for the distributed software system, wherein the model incorporates the one or more specifications in place of the one or more other concurrently executable components; and storing results of the testing in one or more computer-readable storage media;

wherein the undesirable behavior is selected from the group consisting of becoming deadlocked, arriving at a message-passing-based deadlock, reaching an end state for the component while an other concurrently executable component is expecting to send a message to the component or receive a message from the component, waiting by a concurrently executable component for a message that is never to be sent by the other concurrently executable component, sending a message by the concurrently executable component to the other concurrently executable component that is not expecting the message, and becoming stuck.

2. The one or more computer-readable storage media of claim 1 wherein the model incorporates a representation of an implementation of the component.

3. The one or more computer-readable storage media of claim 1 wherein the testing proceeds without access to internal logic of the one or more other concurrently executable components.

4. The one or more computer-readable storage media of claim 1 further comprising computer-executable instructions for performing the following:

determining whether the component complies with a specification of its externally observable message-passing behavior.

5. The one or more computer-readable storage media of claim 1, wherein the concurrently executable components communicate asynchronously.

6. The one or more computer-readable storage media of claim 1, wherein at least one of the components comprises a web service.

7. A computer-implemented method of determining whether a web services system having a plurality of concurrently executable web services will exhibit undesirable behavior, the method comprising:

testing whether a web service and one or more other concurrently executable web services will exhibit undesirable behavior, wherein the testing comprises using at least one specification of externally observable message passing behavior in place of the one or more other concurrently executable web services and building a model for the web service and the one or more other concurrently executable web services, wherein the model incorporates one or more specifications of externally observable message passing behavior in place of the one or more other concurrently executable web services;

testing the model to determine whether the web service complies with the specification of the web service's externally observable message-passing behavior; and storing results of the testing the model in one or more computer-readable storage media;

wherein the undesirable behavior is selected from the group consisting of becoming deadlocked, arriving at a message-passing-based deadlock, reaching an end state for the component while an other concurrently executable component is expecting to send a message to the component or receive a message from the component, waiting by a concurrently executable component for a message that is never to be sent by the other concurrently executable component, sending a message by the concurrently executable component to the other concurrently executable component that is not expecting the message, and becoming stuck.

8. A computer-implemented system for determining whether a distributed software system having a plurality of concurrently executable components will exhibit undesirable behavior, the system comprising:
- at least one processing unit configured to execute software; and
- one or more computer-readable storage media comprising:
  - a software representation of a concurrently executable component being tested;
  - one or more software specifications of externally observable message-passing behavior of one or more others of the concurrently executable components; and
  - a conformance checker software operable to test whether the distributed software system will exhibit undesirable behavior, wherein the testing comprises using the one or more software specifications in place of the one or more others of the concurrently executable components, wherein the conformance checker software is further operable to build a model for the distributed software system, wherein the model incorporates the software representation in place of the concurrently executable component and the one or more software specifications in place of the one or more others of the concurrently executable components, wherein the undesirable behavior is selected from the group consisting of becoming deadlocked, arriving at a message-passing-based deadlock, reaching an end state for the component while an other concurrently executable component is expecting to send a message to the component or receive a message from the component, waiting by a concurrently executable component for a message that is never to be sent by the other concurrently executable component, sending a message by the concurrently executable component to the other concurrently executable component that is not expecting the message, and becoming stuck.

9. The computer-implemented system of claim 8 wherein the conformance checker software is further operable to determine whether the software representation conforms to a specification of its externally observable message-passing behavior.

10. A computer-implemented method of determining whether a component P of a distributed software system having a plurality of other concurrently executable components conforms with a specification of externally observable message-passing behavior Q of the component P, the method comprising:
- reading the specification of externally observable message passing behavior Q;
- determining whether the component P conforms with the specification of externally observable message passing behavior Q, wherein the testing comprises using at least one specification of externally observable message-passing behavior in place of one or more of the other concurrently executable components and building a model of the component P and one or more of other of the concurrently executable components, wherein the model incorporates the at least one specification of externally observable message-passing behavior in place of at least one of the other of the concurrently executable components;
- determining whether the distributed software system will exhibit undesirable behavior, wherein the undesirable behavior is selected from the group consisting of arriving at a message-passing-based deadlock, reaching an end state for the component while one of the other of the concurrently executable components is expecting to send a message to the component or receive a message from the component, waiting by the component for a message that is never to be sent by one of the other of the concurrently executable components sending a message by the component to one of the other of the concurrently executable components, wherein the one of the other of the concurrently executable components is not expecting the message and becoming stuck; and
- storing in one or more computer-readable media results of the determining whether the component P conforms with the specification of externally observable message passing behavior Q and of the determining whether the distributed software system will exhibit undesirable behavior.

11. The computer-implemented method of claim 10, wherein the component P conforms with the specification of the component's externally observable message-passing behavior Q when, for a set of action sequences $\tau^* \cdot \lambda$, a component P' and a specification of externally observable message-passing behavior Q':
If $$P \xrightarrow{\tau^* \cdot \lambda} P'$$

then for some Q', $$Q \xrightarrow{\tau^* \cdot \lambda} Q'$$

and P'≦Q'; and
If P can refuse a set X while ready on a set Y, then Q can refuse the set X while ready on the set Y, wherein the set X comprises one or more labeled transitions for a labeled transition system, and wherein the set Y comprises the empty set or one or more names for the labeled transition system.

12. The computer-implemented method of claim 10, wherein the component P conforms with the specification of the component's externally observable message-passing behavior Q if and only if there exists a relation R containing a pair (P,Q) such that R satisfies the following two conditions for all pairs in a set of pairs (S,T) in R:
- whenever S can transition to S' by first performing an arbitrary sequence of internal communications and then performing an action, then T can transition to a state T' by first performing an arbitrary sequence of internal communications and then performing the same action, where a pair (S',T') is again a member of the relation R; and
- if P can refuse a set X while ready on a set Y, then Q can also refuse the set X while ready on the set Y, wherein the set X comprises one or more labeled transitions for a labeled transition system, and wherein the set Y comprises the empty set or one or more names for the labeled transition system.

13. The computer-implemented method of claim 10, wherein the testing proceeds without access to internal logic of the one or more of the other of the concurrently executable components.

14. The computer-implemented method of claim 10, wherein the concurrently executable components communicate asynchronously.

15. The computer-implemented method of claim 10, wherein at least one of the concurrently executable components comprises a web service.

16. One or more computer-readable storage media having computer-executable instructions for performing the computer-implemented method of claim 10.

17. A computer-implemented system for determining whether a distributed software system having a plurality of concurrently executable components will exhibit undesirable behavior, the system comprising:
- at least one processing unit configured to execute software; and
- one or more computer-readable storage media comprising:
  - a software representation of a concurrently executable component being tested;
  - a software specification of externally observable message-passing behavior of the component being tested;
  - one or more software specifications of externally observable message-passing behavior of one or more others of the concurrently executable components; and
  - a conformance checker software operable to test whether the distributed software system will exhibit undesirable behavior and whether the concurrently executable component being tested conforms to its specification of externally observable message passing behavior, wherein the testing comprises using the one or more software specifications in place of the one or more others of the concurrently executable components, wherein the conformance checker software is further operable to build a model for the distributed software system, wherein the model incorporates the one or more software specifications in place of the one or more others of the concurrently executable components;

wherein the undesirable behavior is selected from the group consisting of becoming deadlocked, arriving at a message-passing-based deadlock, reaching an end state for the component while an other concurrently executable component is expecting to send a message to the component or receive a message from the component, waiting by a concurrently executable component for a message that is never to be sent by the other concurrently executable component, sending a message by the concurrently executable component to the other concurrently executable component that is not expecting the message, and becoming stuck.

18. A computer-implemented method of conformance checking, comprising:
- receiving a specification of externally observable message-passing behavior of a service;
- testing a system, the system comprising an implementation of the service in the system, wherein the testing comprises using the specification of externally observable message-passing behavior of the service in place of the implementation of the service in the system and receiving a model for the implementation of the service in the system, wherein the model incorporates the specification of externally observable message-passing behavior of the service in place of the implementation of the service in the system;
- determining whether the model exhibits an undesirable behavior, wherein the undesirable behavior is selected from the group consisting of becoming deadlocked, arriving at a message-passing-based deadlock, reaching an end state for the service while a concurrently executable component is expecting to send a message to the service or receive a message from the service, waiting by the service for a message that is never to be sent by the concurrently executable component, sending a message by the service to the concurrently executable component that is not expecting the message, and becoming stuck; and
- storing results of the testing and of the determining in one or more computer-readable storage media.

19. The method of claim 18, wherein the service is a component of a message-passing system.

20. A computer-implemented system for conformance checking, comprising:
- at least one processing unit configured to execute software; and
- one or more computer-readable storage media comprising:
  - a software interface specification of a component of a message-passing system; and
  - a conformance checker software, wherein the conformance checker software is operable to test an implementation of the component of the message-passing system, wherein the testing comprises using the software interface specification of the component in place of the component in the implementation of the component of the message-passing system, wherein the test further comprises receiving a model for the implementation of the component of the message-passing system, wherein the model incorporates the software interface specification in place of the component, and wherein the test further comprises determining whether the model exhibits an undesirable behavior, wherein the undesirable behavior is selected from the group consisting of becoming deadlocked, arriving at a message-passing-based deadlock, reaching an end state for the component of the message-passing system while a concurrently executable component is expecting to send a message to the component of the message-passing system or receive a message from the component of the message-passing system, waiting by the component of the message-passing system for a message that is never to be sent by the concurrently executable component, sending a message by the component in the message-passing system to the concurrently executable component that is not expecting the message, and becoming stuck.

21. The computer-implemented system of claim 20, wherein the software interface specification is written in Business Process Execution Language (BPEL).

22. One or more computer-readable storage media having computer-executable instructions for causing a computer to perform a method to determine whether a distributed software system having a component and one or more other concurrently executable components operable to communicate via message passing over a network will exhibit undesirable behavior, the method comprising:
- reading one or more specifications of externally observable message-passing behavior for the one or more other concurrently executable components;
- testing whether the distributed software system will exhibit the undesirable behavior, wherein the testing comprises using the one or more specifications in place of the one or more other concurrently executable components and building a model for the distributed software system, wherein the model incorporates the one or more specifications in place of the one or more other concurrently executable components;
- storing results of the testing in one or more computer-readable storage media; and determining whether the component complies with a specification of its externally observable message-passing behavior, wherein the undesirable behavior is selected from the group consisting of becoming deadlocked, arriving at a message-passing-based deadlock, reaching an end state for the component while an other concurrently executable component is expecting to send a message to the component or receive a message from the component, waiting by a concurrently executable component for a message that is never to be sent by the other concurrently executable component, sending a message by the concurrently executable component to the other concurrently executable component that is not expecting the message, and becoming stuck.

* * * * *